United States Patent
Yoon et al.

(10) Patent No.: US 7,674,405 B2
(45) Date of Patent: Mar. 9, 2010

(54) ZEOLITES WITH INCORPORATED DIPOLAR NONLINEAR OPTICAL MOLECULES IN UNIFORM ORIENTATION AND PREPARATION THEREOF

(75) Inventors: Kyung Byung Yoon, Seoul (KR); Bum Ku Rhee, Gyeonggi-do (KR); Do Seok Kim, Seoul (KR); Hyun Sung Kim, Seoul (KR); Kwang Ha, Seoul (KR); Yun Jo Lee, Seoul (KR); Seung Mook Lee, Seoul (KR); Chang Soo Jung, Gwangju (KR); Yu Sung Chun, Gyeonggi-do (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 547 days.

(21) Appl. No.: 11/423,365

(22) Filed: Jun. 9, 2006

(65) Prior Publication Data

US 2006/0219989 A1    Oct. 5, 2006

(51) Int. Cl.
| | |
|---|---|
| *F21V 9/00* | (2006.01) |
| *G02B 5/02* | (2006.01) |
| *G02C 7/10* | (2006.01) |
| *G02F 1/361* | (2006.01) |
| *G03B 11/00* | (2006.01) |

(52) U.S. Cl. .................. 252/582; 502/60; 385/122; 428/221; 428/409; 428/411.1

(58) Field of Classification Search ............... 252/582; 428/221, 332, 409, 411.1; 385/122; 502/60
See application file for complete search history.

(56) References Cited

U.S. PATENT DOCUMENTS

| 5,348,687 A | 9/1994 | Beck et al. |
| 5,736,592 A | 4/1998 | DeMeuse et al. |
| 5,763,066 A * | 6/1998 | Kim et al. ................. 428/221 |
| 2003/0017936 A1 * | 1/2003 | Yoon et al. ................. 502/60 |

FOREIGN PATENT DOCUMENTS

| JP | 03164721 | 7/1991 |
| WO | 9408269 | 4/1994 |

OTHER PUBLICATIONS

Jin Seok Lee, Yun-Jo Lee, Eunju Lee Tae, Yong Soo Park, Kyung Byung Yoon, Synthesis of Zeolite As Ordered Multicrystal Arrays, Aug. 8, 2003 vol. 301, pp. 818-821, Science www.sciencemag.org.*
Hyun Sung Kim, Seung Mook Lee, Kwang Ha, Changsoo Jung, Yun-Jo Lee, Yu Sung Chun, Doseok Kim, Bum Ku Rhee, and Kyung Byung Yoon, Aligned Inclusion of Hemicyanine Dyes into Silica Zeolite Films for Second Harmonic Generation J. Am. Chem. Soc. 2004, 126, 673-682 9 673 (2004 American Chemical Society).*
D. Kim, T. K. Shim, M. H. Lee, J. Sung and B. K. Rhee, H. S. Kim and K. B. Yoon, Photophysical Properties of Hemicyanine Dyes in Zeolite Film Grown on Glass Plate, Journal of the Korean Physical Society, vol. 44, No. 3, Mar. 2004, pp. 708-711.*
Pending U.S. Appl. No. 10/560,964 to Yoon et al., filed Dec. 16, 2005.
Pending U.S. Appl. No. 10/566,603 to Lee et al., filed Jan. 31, 2006.

* cited by examiner

*Primary Examiner*—Harold Y. Pyon
*Assistant Examiner*—Bijan Ahvazi
(74) *Attorney, Agent, or Firm*—The Nath Law Group; Susanne M. Hopkins; Mihsuhn Koh

(57) ABSTRACT

The present invention relates to a method for incorporating into zeolite pores dipolar nonlinear optical (DNLO) molecules in a uniform orientation and a DNLO-zeolite composite in which DNLO molecules are included in a uniform orientation into zeolite pores.

23 Claims, 17 Drawing Sheets

Uniformly aligned silicalite-1 film on glass

Hemicyanine with a long alkyl chain

ZEOLITES WITH INCORPORATED DIPOLAR NONLINEAR OPTICAL MOLECULES IN UNIFORM ORIENTATION AND PREPARATION THEREOF

BACKGROUND OF THE INVENTION

1. Field of the Invention

The present invention relates to a method for incorporating into zeolite pores dipolar nonlinear optical (DNLO) molecules in a uniform orientation and a DNLO-zeolite composite in which DNLO molecules are included in a uniform orientation into zeolite pores.

2. Description of the Related Art

Incidence of laser beams with a frequency of $\omega$ into second-order nonlinear optical materials results in the occurrence of harmonic wave with a frequency of $2\omega$. This phenomenon has been applied to the development of optical switch, optical sensor and devices generating new laser beams with short wavelength.[1-4] A wide variety of inorganic crystals are used as second-order nonlinear optical materials. However, the inorganic crystals have serious problems: less feasibility to prepare crystals of a suitable size; and slower response time due to high dielectric constant. Therefore, attempts have been extensively made to replace inorganic crystals with organic materials with second order nonlinear optical properties.[1-4]

Various organic molecules with second order nonlinear optical properties have been suggested and their representative is a dipolar nonlinear optical (DNLO) molecule expressed by D-$\pi$-A in which an electron donor portion having relatively rich electrons is conjugated to an electron acceptor portion having relatively deficient electrons.[1-4] Even though a single DNLO molecule exhibits significantly high value of second-order hyperpolarizability constant that becomes increased with help of molecular design, various optical devices such as optical switch cannot be manufactured using a single DNLO molecule.

Therefore, it could be appreciated that only crystals or aggregates comprises of DNLO molecules aligned in one direction (orientation) are useful in the development of optical devices. However, upon crystallizing, most of D-$\pi$-A molecules show the strong alignment tendency to counterbalance dipole moments each other. Hitherto, a lot of attempts have been made to prepare crystals of DNLO molecules aligned in one direction but most of them have been unsuccessful.[1]

One of approaches having been suggested, which is generally called electric poling, is to align DNLO molecules in one direction by imposing strong electric field on DNLO molecules incorporated homogeneously in a polymer medium at glass transition temperature of the polymer.[2]

The incorporation of DNLO molecules into a polymer medium is executed by a physical mixing process or a chemical process in which DNLO molecules are covalently linked to a polymer chain. However, poled polymers of nonlinear optical molecules show low second-order nonlinear optical sensitivity per unit volume, expressed by $d_{33}$ (a tensor component of the quadratic nonlinear susceptibility), regardless of the type of incorporation methods. Furthermore, the alignment of DNLO molecules incorporated is very likely to be spontaneously disrupted with the lapse of time even at relatively low temperature, rendering applicability of the poled polymers to be sharply decreased.[3]

Much effort has been directed at utilizing DNLO molecules as self-assembled mono- or multilayers[4-8] and polymer-DNLO composite films supported on optically transparent substrates.[1,2,9-13] However, although the organic thin films of DNLO molecules show significantly high second-order nonlinear optical sensitivity per unit volume, their thickness is very little and their thermal and mechanical strength are far poor, making their practicability negligible. The disadvantages associated with the organic thin films of DNLO molecules have triggered scientists for other novel conceptual approaches in the use of DNLO molecules.

Along this line, zeolites and the related nanoporous materials have been examined as hosts for aligned incorporation of DNLO molecules to explore novel organic-inorganic composites.[14-22] For example, Stucky and the coworkers first reported that DNLO molecules such as para-nitroaniline (PNA), 2-methyl-4-nitroaniline (MNA), 2-amino-4-nitropyridine, and the analogous compounds readily enter the straight channels of AlPO$_4$-5 [a noncentrosymmetric (P6cc) zeolite analog having one-dimensional channels with the diameter of 0.8 nm], and the dye-incorporating AlPO$_4$-5 powders generate second harmonic (SH) with the intensity far exceeding that of quartz powders.[14,15]

Subsequent studies by Marlow, Caro and their coworkers revealed that the SHG activity of the PNA-including AlPO$_4$-5 crystals arose as a result of the spontaneous incorporation of PNA into the channels of AlPO$_4$-5 with the nitro group first caused by the intrinsically higher affinity of the AlPO$_4$-5 channels to nitro than amino group.[16] Since the sizes of the crystals far exceeded (such as 130 μm) the wavelength of the incident laser beam (1.064 μm), the polarization reversal that occurred at the center of each crystal did not affect the overall SHG activities of the dye-loaded AlPO$_4$-5 crystals. They also found that the AlPO$_4$-5 crystals loaded with 4-nitro-N,N-dimethylaniline[17] or (dimethylamino)benzonitrile[18] are active for SHG.

The MFI-type structures such as ZSM-5[19] and Sb-incorporating silicalite-1 (Sb-SL)[20] [centrosymmetric (Pnma) zeolites having a three-dimensional channel system consisting of straight 0.54×0.56 nm channels in one direction and sinusoidal 0.51×0.54 nm channels in other direction perpendicular to the straight channels] have also been shown to be SHG active upon PNA loading. However, in the case of Sb-SL loaded with PNA, the SHG activity disappeared after several exposures to incident laser beams. Unlike ZSM-5 and Sb-SL which contain Al and Sb, respectively, in the framework, the closely related pure silica ZSM-12 [a centrosymmetric (C2/c) silica zeolite having one-dimensional channels with the diameter of 0.56×0.59 nm] did not show any SHG activity even after inclusion of PNA.[21]

Interestingly, PNA-loaded mesoporous silica, MCM-41 (an amorphous silica having a hexagonal array of channels with the diameter of 2-8 nm) also showed a SHG activity, although its pore diameter is much larger than the size of PNA.[22] For them to be SHG active, however, aging of the composite under humid air for several weeks was necessary, indicating the requirement of the water-assisted secondary reorganization of the included PNA molecules to give rise to a net bulk dipole moment.

Thus, the previous works have demonstrated the potential of zeolites and the related nanoporous materials to be developed into versatile inorganic hosts for preparation of practically viable organic-inorganic composite SHG materials. However, the previous studies have been limited to PNA ($\beta_{PNA}$=34.5±4×10$^{-30}$ esu) and several analogous DNLO molecules with $\beta$ values lower than 500×10$^{-30}$ esu[23,24] and a large variety of DNLO molecules with much higher $\beta$-values have been known to be not aligned spontaneously upon incorporating them into zeolite pores. Accordingly, the spontaneous alignment of PNA and several analogous DNLO molecules upon entering AlPO$_4$-5, Sb—SL, and ZSM-5 channels has been determined rare cases.

Furthermore, the examined zeolite forms have been limited to powders and very small single crystals that bear no practical applicability. It is therefore necessary to develop methods for incorporating general DNLO molecules with higher β values into the zeolites in one direction. Also, for practical viability, efforts should be directed at extending zeolite hosts for the aligned incorporation of DNLO molecules to microcrystals, thin films of mono- or multi-layered microcrystals on substrates that are uniformly aligned, films prepared by growing microcrystals uniformly aligned on supporting substrates and supercrystals prepared by aligning microcrystals in three dimension with no substrates.

Throughout this applications various publications are referenced and citations are provided in parentheses. The disclosure of these publications in their entities are hereby incorporated by references into this application in order to more fully describe this invention and the state of the art to which this invention pertains.

SUMMARY OF THE INVENTION

The present inventors have made intensive researches to meet the long felt need of the art described previously, and a result, found that dipolar nonlinear optical (DNLO) molecules modified in a suitable manner are incorporated in a uniform orientation into zeolite pores, thereby giving DNLO-zeolite composites having excellent nonlinear optical properties.

Accordingly, it is an object of this invention to provide a method for incorporating into zeolite pores dipolar nonlinear optical (DNLO) molecules in a uniform orientation.

It is another object of this invention to provide a DNLO-zeolite film composite.

It is still another object of this invention to provide a DNLO-zeolite thin film composite.

It is further object of this invention to provide a DNLO-zeolite supercrystal composite.

Other objects and advantages of the present invention will become apparent from the detailed description to follow and together with the appended claims and drawings.

DETAILED DESCRIPTION OF THIS INVENTION

Figure 1A:
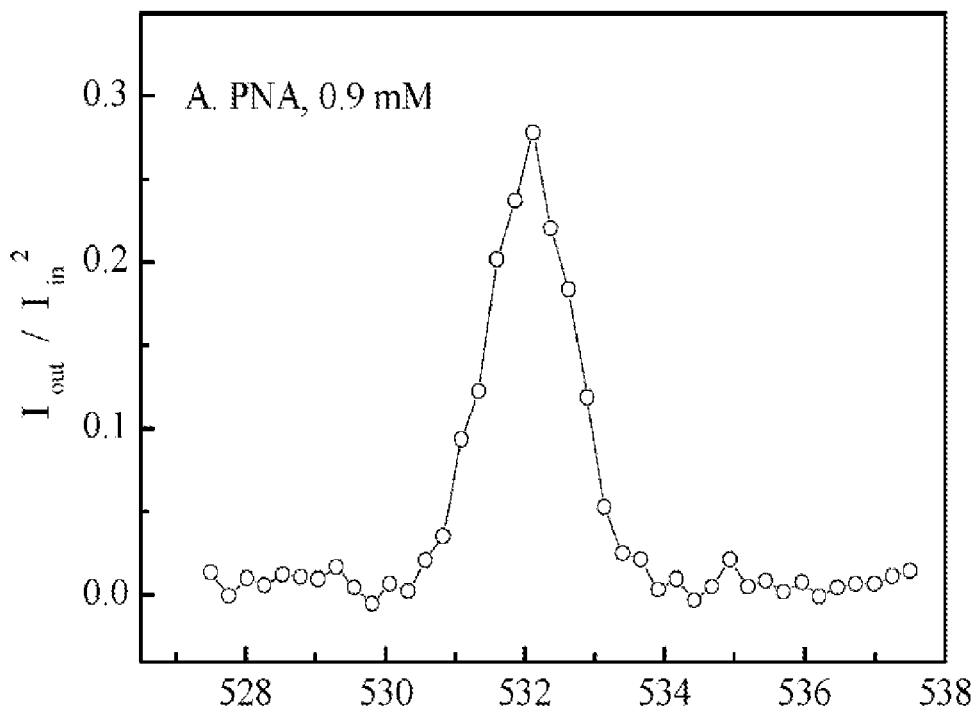
FIG. 1A represents the HRS (hyper Rayleigh scattering) signal of the methanol solution of PNA (0.9 mM, para-nitroaniline)

In one aspect of this invention, there is provided a method for incorporating into zeolite pores dipolar nonlinear optical (DNLO) molecules in a uniform orientation, which comprises the steps of: (a) preparing a R-[D-π-A] or [D-π-A]-R by linking a R-group to the terminal of a parent molecule ([D-π-A]) of the dipolar nonlinear optical (DNLO) molecule; and (b) incorporating the R-[D-π-A] or [D-π-A]-R into the zeolite pores, wherein the R-group has hydrophobicity, the parent molecule ([D-π-A]) has hydrophilicity, D represents an electron donor portion, A represents an electron acceptor portion, R represents alkyl, alkenyl, cycloalkyl, cycloalkenyl, aryl, heteroaryl, arylalkyl, arylalkenyl, alkylaryl or their combination; in which when the zeolite pores are hydrophobic, the incorporation of the R-[D-π-A] or [D-π-A]-R into the zeolite pores occurs in the direction of its hydrophobic R-group and when the zeolite pores are hydrophilic, the incorporation of the R-[D-π-A] or [D-π-A]-R into the zeolite pore occurs in the direction of its hydrophilic [D-π-A], whereby the DNLO molecules incorporated into the zeolite pores are present in the uniform orientation.

In another aspect of this invention, there is provided a DNLO-zeolite film composite comprising DNLO (dipolar nonlinear optical) molecules incorporated in a zeolite film prepared by growing zeolite microcrystals on a substrate, characterized in that the incorporated DNLO molecules are present in only one orientation.

In still another aspect of this inventions there is provided a DNLO-zeolite thin film composite comprising DNLO (dipolar nonlinear optical) molecules incorporated in a zeolite thin film prepared by arranging zeolite microcrystals to form a mono- or multi-layer on a substrate, characterized in that the incorporated DNLO molecules are present in only one orientation.

In further aspect of this invention, there is provided a DNLO-zeolite thin film composite comprising DNLO (dipolar nonlinear optical) molecules incorporated in a zeolite thin film prepared by arranging zeolite microcrystals to form a mono- or multi-layer on a substrate, characterized in that a part of said incorporated DNLO molecules are present in the opposition orientation to a residual part of said incorporated DNLO molecules.

In still further aspect of this invention, there is provided a DNLO-zeolite supercrystal composite comprising DNLO (dipolar nonlinear optical) molecules incorporated in a zeolite supercrystal prepared by aligning zeolite microcrystals uniformly in two- or three dimension, characterized in that said incorporated DNLO molecules are present in only one orientation.

In another aspect of this inventions there is provided a DNLO-zeolite supercrystal composite comprising DNLO (dipolar nonlinear optical) molecules incorporated in a zeolite supercrystal prepared by aligning zeolite microcrystals uniformly in two- or three dimension, characterized in that a part of said incorporated DNLO molecules are present in the opposition orientation to a residual part of said incorporated DNLO molecules.

Generally, [D-π-A]-typed second-order nonlinear optical molecules in the form of gas or solution are likely to be randomly incorporated (included) into zeolite pores. Such zeolites including nonlinear optical molecules in random orientation exhibit no nonlinear optical properties. The present invention takes a giant step to overcome the shortcomings associated with nonlinear optical molecules.

Zeolite has been widely used in a large variety of fields such as household, industry and laboratory, and called a molecular sieve due to its nanopores with uniform pore shape and size. The pore size of zeolite ranges from 0.3 to 1.3 nm, corresponding to the size of a molecule. Zeolites generally exist in the form of microcrystal whose size ranges from 100 nm to 10 μm. The zeolite microcrystals are used as such, or arranged and organized to mono- or multi-layer on substrates. And, they are used in the form of supercrystal prepared by arranging and organizing microcrystals two-dimensionally or three-dimensionally. They are also used in the form of a continuous film prepared by growing microcrystals on substrates.

Zeolite is a generic name of crystalline aluminosilicate, which constitutes the pore skeleton of zeolite molecules and bears an anionic charge for each aluminum atom. Cations for compensating such anion charges are present within the very fine pore space and the remaining pore space is usually filled with water.

While the term zeolite classically means porous crystalline aluminosilicate, one of ordinary skill in the art also usually recognizes as zeolite various zeotype molecular sieves wherein a part or all of silicon (Si) and/or aluminum (Al) atoms constituting the structural skeleton of zeolite molecule are replaced with other elements. For example, a mesoporous silica (MCM-series mesoporous silica and silicate) in which aluminum atoms are completely eliminated, an alpo ($AlPO_4$)-typed molecular sieve in which silicon atoms are replaced with phosphorous atoms, and other molecular sieves or zeotype materials wherein skeleton metal atoms are partially replaced with various metal atom such as Ti, Mn, Co, Fe and Zn have been developed and widely used. The materials described above are derived from zeolites and thus generally called as zeolites in the art. Accordingly, the term "zeolite" used herein refers to zeolite in a broad sense including zeotype molecular sieves described previously.

Zeolite deprived of water molecules in its pores can include various molecules in the place of water molecules within the permission of its pore size. At this time, if the framework of zeolite is constituted with aluminum, silicon and cross-linking oxygen atoms, pores bear an anionic charge and cations for compensating such anion charges are present within the pore space, leading to their hydrophilicity. Such hydrophilicity increases as increasing the content of aluminum. In contrast to this, the polarity of pores decreases as decreasing the content of aluminum, leading to their hydrophobicity. Therefore, silicalite constituted only with silicon and cross-linking oxygen atoms is the most hydrophobic among various zeolites.

Zeolites or zeotype molecular sieves useful in the present invention are not limited and preferably include as follows:
(i) natural and synthetic zeolite;
(ii) modified molecular sizes wherein all or a part of the silicon atoms in the zeolite skeleton are replaced with other atoms such as phosphorous (P) (e.g., $AlPO_4$, SAPO, MeAPO, MeAPSO typed molecular sieves);
(iii) modified molecular sieve in which all or a part of the aluminum atoms in the zeolite skeleton are replaced with other atoms such as boron (B), gallium (Ga) and titanium (Ti);
(iv) molecular sieves prepared by the combination of the above modifications of items ii) and iii);
(v) porous metals or silicon oxides (e.g., silicalite, MCM typed porous silica, porous titanium dioxide and niobium dioxide) or composite oxide thereof; and
(vi) porous molecular sieves prepared using any other elements alone or in a combination.

Zeolites and zeotype molecular sieves used in this invention may be in a variety of forms, preferably, (i) a film prepared by growing zeolite microcrystals on a substrate, (ii) a thin film of mono- or multi-layered zeolite microcrystals on substrate, or (iii) a supercrystal of two or three dimensional aggregates of zeolite microcrystals. The term "supercrystal" used herein refers to an organized or assembled structure of crystals in two- or three-dimension. The term "zeolite supercrystal" means an organized or assembled structure of zeolite crystals in two- or three-dimension.

The term "substrate" used herein refers to a material capable of supporting other material (such as film and thin film) that is covalently or non-covalently attached to the substrate. Preferably, the substrate is covalently attached to the supported material.

The exemplified substrate useful in this invention includes:
(i) materials containing hydroxyl groups on their surface, for example, oxides or mixed oxides of metals and non-metals such as silicon, aluminum, titanium, tin and indium, which can be used alone or in a mixture, for example, glass, quartz, mica, ITO (indium tin oxide) glass (glass deposited with indium tin oxide), tin oxide ($SnO_2$), and other conductive glass, silica, porous silica, alumina, porous alumina, titanium dioxide, porous titanium dioxide, silicon wafer and the like;
(ii) metals capable of reacting with a thiol or amino group, such as gold, platinum, silver and copper;
(iii) polymers having various functional groups on their surface, such as PVC, a Merrifield peptide resin and the like;
(iv) semiconductive materials such as selenium-zinc (ZnSe), gallium-arsenic (GaAs) and indium-phosphor (InP);
(v) natural materials of high molecular weight, which carry hydroxyl groups on their surface such as cellulose, starch (e.g., amylose and amylopectin) and lignin; and
(vi) natural or synthetic zeolite or zeotype molecules.

It is preferred that the substrate is selected from the group consisting of glass, quartz, mica, ITO glass or electrode, silicon wafer, metal oxide (such as $SiO_2$, $GeO_2$, Ago, $Al_2O_3$, $Fe_2O_3$ and CuO), porous oxide, porous alumina and porous stainless steel.

According to a preferred embodiment, zeolites used in this invention are in a uniform orientation. The term "uniform orientation" used herein means a regular arrangement of materials of subject, i.e., a regular arrangement of materials of subject in at least one axis. Therefore, the phrases "zeolite in uniform orientation", "uniformly oriented zeolite" "uniformly arranged or aligned zeolite" and the like refer to zeolites prepared with controlling their growth direction to have one orientation (a-, b- or c-axis). As a result, such uniformly oriented zeolites have channels (pores) with uniform orientation within their structure.

Meanwhile, the present inventors had reported a pioneering approach to confer a uniform orientation on zeolite crystals (J. S. Lee, Y.-J. Lee, E. L. Tae, Y. S. Park, K. B. Yoon, *Science*, 2003, 301, 818-821).

According to the present invention, DNLO molecules are incorporated (included) with uniform orientation into zeolite pores (i.e., zeolite channels). The term "uniform orientation" used herein with referring to the manners of incorporation of DNLO molecules has distinctly different meaning from the term "uniform orientation" with referring to orientations of zeolites or zeolite pores. More specifically, the term "uniform orientation" with referring to the manners of incorporation of DNLO molecules is used herein to describe two incorporation manners of DNLO molecules into zeolite pores. According to a preferred embodiment, the R-[D-π-A] or [D-π-A]-R molecules incorporated into zeolite pore are present in only one orientation. Alternatively, the R-[D-π-A] or [D-π-A]-R molecules are incorporated into opposite both sides of zeolite pores, whereby a part of the R-[D-π-A] or [D-π-A]-R molecules incorporated are present in the opposition orientation to a residual part of the R-[D-π-A] or [D-π-A]-R molecules incorporated. The opposition orientation is well observed at the center part of zeolite structure.

The uniform incorporation of R-[D-π-A] or [D-π-A]-R molecules into zeolite pores described previously is described in more detail as follows: Firstly, where the R-[D-π-A] or [D-π-A]-R molecules are incorporated into films with closed one side such as continuous zeolite films formed on substrates, they are incorporated in only one orientation depending on hydrophilicity or hydrophobicity of zeolite pores. Secondly, where the R-[D-π-A] or [D-π-A]-R molecules are incorporated into thin films or crystals with open both sides, a part of them included in zeolite pores are present in the opposition orientation to a residual part of them included in zeolite pores. The opposition orientation is well defined by the observation at the center part of zeolite structure.

The incorporation manner of R-[D-π-A] or [D-π-A]-R molecules is alternatively described as follows: where an arrow tail denotes the hydrophobic R-group and an arrow head denotes the hydrophilic [D-π-A], the first incorporation is expressed by [→→] or [←←] orientations (i.e., head-to-tail or tail-to-head orientation) and the second incorporation is expressed by [→←] or [←→] (i.e., head-to-head or tail-to-tail orientation).

The most striking feature of this invention is to modify dipolar nonlinear optical molecules. The modification is made at two distinct portions of DNLO molecules, i.e., a hydrophobic portion and a hydrophilic portion. According to the present invention, the terms "hydrophobicity" and "hydrophilicity" used herein with referring to DNLO molecules do not possess an absolute meaning. Instead, a portion with relatively more hydrophobicity within DNLO molecule is described as hydrophobic portion and a portion with relatively more hydrophilicity within DNLO molecule is described as hydrophilicity portion.

The parent molecule of DNLO molecules, [D-π-A] is generally hydrophilic. Therefore, modifying the parent molecules refers to linking hydrophobic portion to the parent molecules.

The R-group conferring hydrophobicity is selected from the group consisting of alkyl, alkenyl, cycloalkyl, cycloalkenyl, aryl, heteroaryl, arylalkyl, arylalkenyl, alkylaryl and their combination. Preferably, R is $C_3$-$C_{30}$ alkyl, $C_4$-$C_{30}$ alkenyl, $C_3$-$C_{10}$ cycloalkyl or $C_5$-$C_{10}$ cycloalkenyl. Where R is alkyl group, R is $C_9$-$C_{30}$ alkyl more preferably and $C_{15}$-$C_{30}$ most preferably.

The term "alkyl" is defined herein to be straight chain or branched chain saturated hydrocarbon group and the term "alkenyl" means a branched or unbranched unsaturated hydrocarbon chain comprising a designated number of carbon atoms. The term "cycloalkyl" is defined herein to include cyclic hydrocarbon radicals and the term "cycloalkenyl" means cyclic hydrocarbon radicals including at least one carbon-carbon double bond.

The term "aryl" is defined herein as a monocyclic or polycyclic group, preferably a monocyclic or bicyclic group, i.e. phenyl or naphthyl, which can be unsubstituted or substituted, for example, with one or more and, in particular, one to three substituents. The term "heteroaryl" is defined herein as a heterocyclic aromatic group which carries N, O or S atom as a heteroatom and the term "arylalkyl" (aralkyl) means an aryl that is covalently jointed to an alkyl group. The term "alkylaryl" (alkaryl) refers to an alkyl that is covalently jointed to an aryl group and the term "arylalkenyl" refers to an aryl that is covalently jointed to an alkenyl group.

In R-[D-π-A] or [D-π-A]-R prepared by modifying the parent molecule of DNLO molecules, the unmodified terminal may be modified with substituents (e.g., —$CH_3$) unless the relative hydrophilicity of [D-π-A] is disrupted. Therefore, molecules with two modified terminals, $R_1$-[D-π-A]-$R_2$ can be also used in this invention.

The DNLO molecule is generally polar and its D or A portion is relatively more polar than other portion. Upon linking R-group capable of conferring hydrophobicity to the terminal of the parent molecule, the R-group becomes a hydrophobic portion and the parent molecule [D-π-A] becomes a hydrophilic portion. Therefore, R-[D-π-A] or [D-π-A]-R is comprised of a hydrophilic [D-π-A] portion and a hydrophobic R portion.

The R-[D-π-A] or [D-π-A]-R typed DNLO molecules prepared thus strongly intend to be incorporated into hydrophobic zeolite pores (i.e., zeolite channels) in the direction of their hydrophobic R-group. In other words, the R-[D-π-A] or [D-π-A]-R molecules enter hydrophobic zeolite pores with the hydrophobic tail part first. Contrary to this, the R-[D-π-A] or [D-π-A]-R typed DNLO molecules strongly intend to be incorporated into hydrophilic zeolite pores (i.e., zeolite channels) in the direction of their hydrophilic [D-π-A] portion. In other words, the R-[D-π-A] or [D-π-A]-R molecules enter hydrophilic zeolite pores with the hydrophilic head part first. Consequently, the R-[D-π-A] or [D-π-A]-R typed DNLO molecules are incorporated in a uniform orientation into zeolite pores.

The R-[D-π-A] or [D-π-A]-R typed DNLO molecules useful in the present invention are illustrated as follows:

(i) Hemicyanine(4-[4-(dimethylamino)styryl]-1-docosyl-pyridinium bromide) based compounds

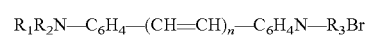

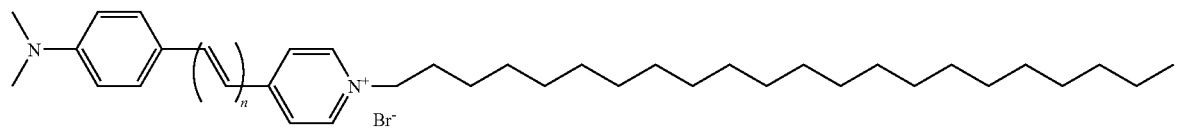
(I)
n = 1 ... 10
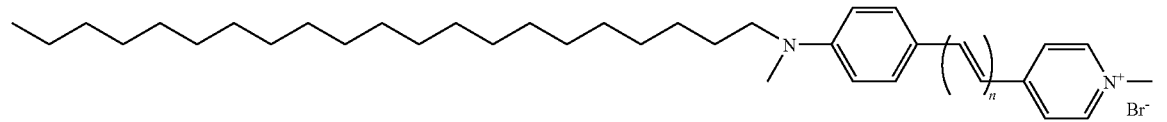
(II)
n = 1 ... 10
(ii) Merocyanine(1-docosyl-4-(4-hydroxystyryl)pyridinium bromide) based compounds
$R_1O-C_6H_4-(CH=CH)_n-C_6H_4N-R_2Br$
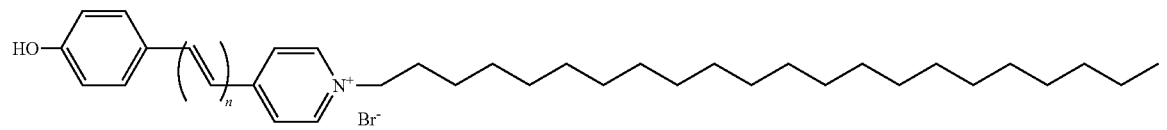
(III)
n = 1 ... 10
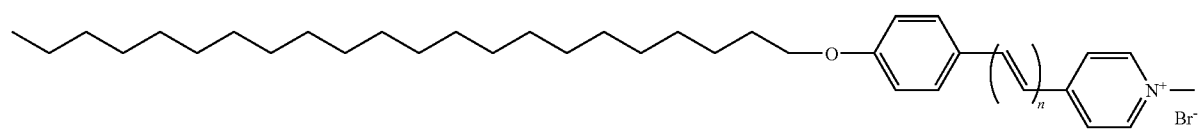
(IV)
n = 1 ... 10
(iii) Nitrostilbene(4-heptadecylamido-4'-nitrostilbene) based compounds
$O_2N-C_6H_4-(CH=CH)_n-C_6H_4-NHC=O(R)$
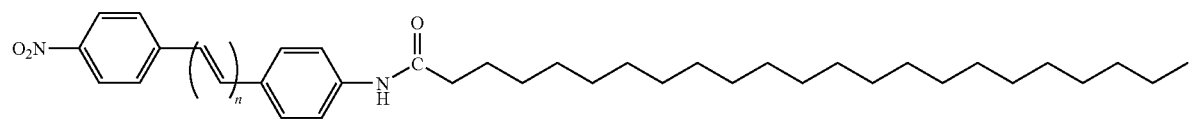
(V)
n = 1 ... 10
(iv) Disperse Orange 3 (4-(4-nitrophenylazo)aniline) based compounds
$O_2N-C_6H_4-N=N-C_6H_4-NR_1R_2$
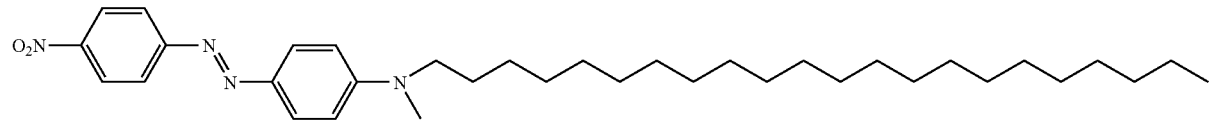
(VI)

(v) Disperse Orange 13 (4-[4-(phenylazo)-1-naphthylazo] phenol) based compounds
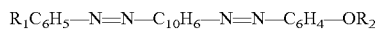
(VII)
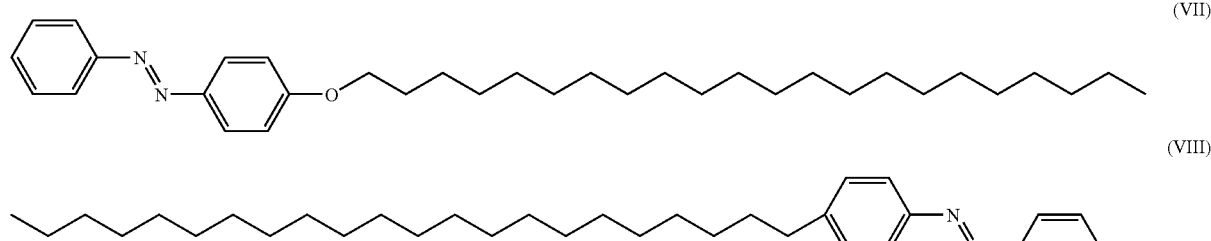
(VIII)
(vi) Disperse Orange 25 (3-[N-ethyl-4-(4-nitrophenylazo) phenylamino]propionitrile) based compounds
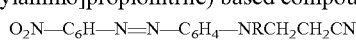
(IX)
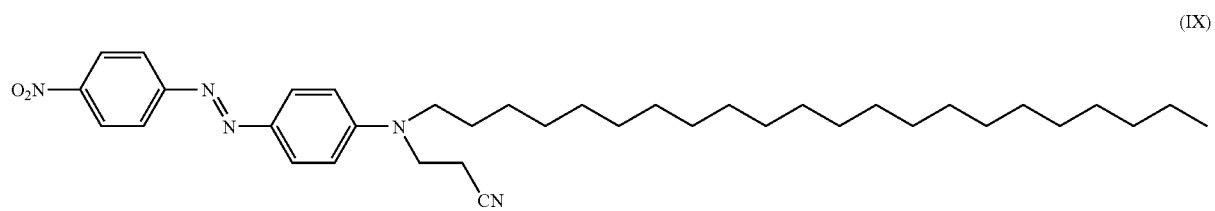
(vii) Disperse Red 1 (2-[N-ethyl-4-(4-nitrophenylazo)-phenylamino]ethanol) based compounds
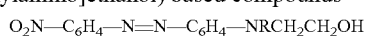
(X)
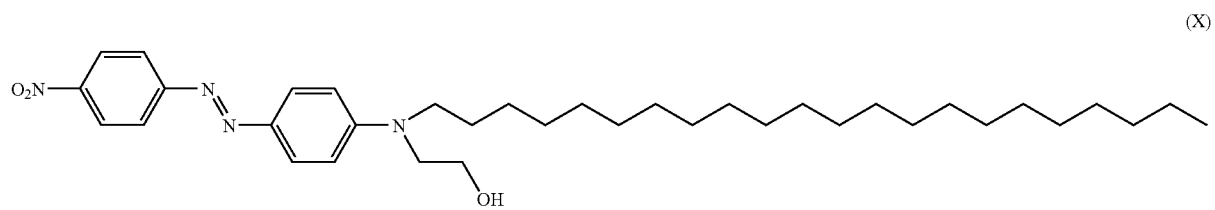
(viii) Disperse Red 13 (2-[4-(2-chloro-4-nitrophenylazo)-N-ethylphenylamino]ethanol) based compounds
(XI)
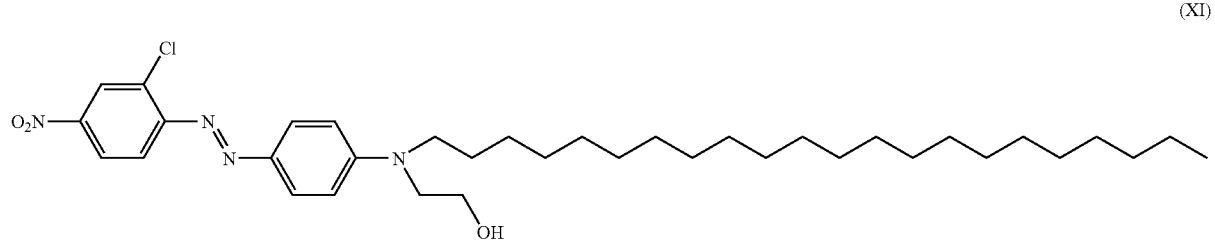

(ix) Disperse Yellow 7 (4-[4-(phenylazo)phenylazo]-o-cresol) based compounds

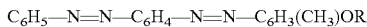

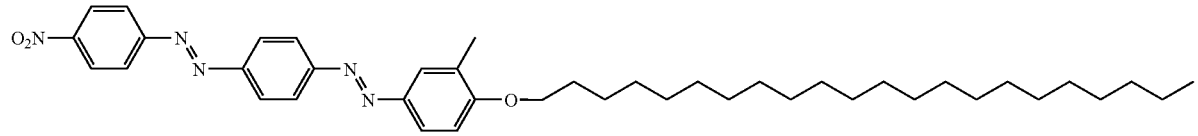

(XII)

(x) other organic compounds such as methyl nitroaniline (MNA), N-(4-nitrophenyl)-L-prolinol (NPP), (−)-2-α-methyl benzylamino-5-nitropyridine (MBA-NP), 3-methyl-4-methoxy-4'-nitrostilbene (MMONS), 2-(N-prolinol)-5-nitropyridine (PNP), 3-methyl-4-nitropyridine-1-oxide (POM)

Surprisingly, DNLO molecules incorporated into zeolite pores according to this invention are not limited in terms of their hyperpoloarizability constant (β value). According to the present invention, DNLO molecules having β value of more than 500 as well as less than 500 can be incorporated in a uniform orientation into zeolite pores.

The present method will be specifically described with referring to Examples described below. Firstly, zeolites are synthesized. If organic template remains after synthesis of zeolites, zeolites in the form of film, microcrystals or supercrystals are subject to calcination at suitable temperature under oxygen atmosphere or exposure to ultraviolet ray for removing organic template. Afterwards, R-[D-π-A] or [D-π-A]-R molecules are dissolved in solvent (e.g., methanol), and the resulting zeolites are immersed in the solution for suitable period of time. The zeolites are taken out from the solution and washed with the same solvent, followed by drying, thereby giving zeolite with incorporated R-[D-π-A] or [D-π-A]-R molecules in a uniform orientation.

Figure 11:
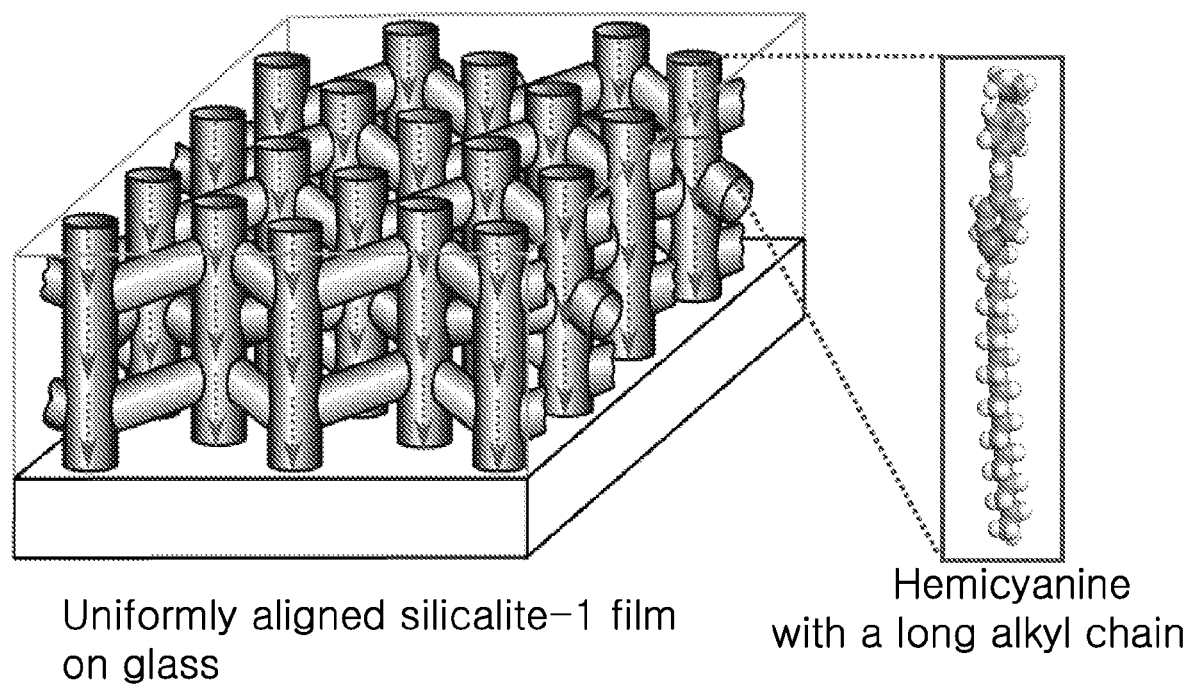
FIG. 11 schematically represents dipolar nonlinear optical (DNLO) molecules incorporated in a uniform orientation into zeolite pores.

FIG. 11 schematically represents DNLO molecules incorporated in a uniform orientation into zeolite pores (i.e, channels) according to this invention.

The present method ensures the applicability of various DNLO molecules regardless of their hyperpoloarizability (β value).

The present invention provides DNLO-zeolite composites in various forms (e.g., film, thin film and supercrystal).

According to a preferred embodiment of the DNLO-zeolite film composite of the present invention, the zeolite film is prepared by growing zeolite microcrystals unidirectionally on a substrate. Preferably, the DNLO-zeolite film composite is prepared in accordance with the present method set forth previously.

According to preferred embodiment of the DNLO-zeolite thin film composite of the present invention, the zeolite thin film is prepared by arranging zeolite microcrystals undirectionally on a substrate. Preferably, the DNLO-zeolite thin film composite is prepared in accordance with the present method set forth previously.

In accordance with a preferred embodiment of the DNLO-zeolite supercrystal composite, the DNLO-zeolite supercrystal composite is prepared in accordance with the present method set forth previously.

Generally, DNLO molecules incorporated in DNLO-zeolite composites of the present invention are not limited with regard to their hyperpoloarizability (β value). Preferably, DNLO molecules incorporated have hyperpoloarizability (β value) of more than $100 \times 10^{-30}$ esu, more preferably more than $300 \times 10^{-30}$ esu, still more preferably, more than $400 \times 10^{-30}$ esu, and most preferably, more than $500 \times 10^{-30}$ esu.

The present DNLO-zeolite composites in which DNLO molecules are included in a uniform orientation exhibit excellent nonlinear optical properties, enabling various DNLO molecules to be applied to a wide variety of opto-electronics fields including devices for the storage and transmission of information, optical fiber communication, optical computer and devise for laser apparatus The following specific examples are intended to be illustrative of the invention and should not be construed as limiting the scope of the invention as defined by appended claims.

EXAMPLES

Materials

A series of n-alkyl bromides ($C_nH_{2n+1}Br$) were purchased from TCI (n=3, 6, 9, 12, 15, and 18) and Aldrich (n=22), and used as received. 1-Tetracosyl bromide (n-$C_{24}H_{49}Br$) was prepared from the corresponding alcohol (Aldrich) according to the following procedure. Triphenylphosphine (95 mg, 0.36 mmol) and carbontetrabromide (120 mg, 0.36 mmol) were sequentially introduced into a dichloromethane solution (50 ml) dissolved with 1-tetracosanol (60 mg, 0.17 mmol), and the mixture was stirred at room temperature for 12 hr. The solvent was then removed by evacuation, and the produced 1-tetracosyl bromide was isolated from the reaction mixture by column chromatography. 4-[4-(Dimethylamino)styryl]pyridin (Aldrich), tetraethylorthosilicate (TEOS, Acros), sodium aluminate ($NaAlO_2$, Kanto) and tetrapropylammonium hydroxide (TPAOH, Aldrich) were purchased, and used as received. n-Octadecane and n-heptadecane were purchased from PolyScience Corporation and used as such. 4-Nitroaniline was purchased from Aldrich, and used as such.

Example I

Preparation of 4-[4-(dimethylamino)styryl]-1-n-alkylpyridinium bromide (HC-n)

The HC-n nonlinear dyes were prepared by refluxing the acetonitrile solution (25 ml) of 4-[4-(dimethylamino)styryl]pyridin (1 mmol) and the corresponding 1-bromoalkane (1 mmol) for varying periods of time until the initially colorless solution turned dark red (for instance, it required 6 days for HC-18). The solvent from each reaction mixture was removed under vacuum. Ethyl acetate (100 ml) was introduced into the reaction flask containing the crude products, and the heterogeneous mixture was poured on top of a silica gel column. To remove non-reacted starting compounds, copious amounts of ethyl acetate were passed through the column until pure ethyl acetate was collected from the column. The residual red salt was separated from silica gel by passing copious amounts of methanol through the column and by collecting the red methanol solution. The red product was isolated by evaporation of methanol. The product was redissolved into a minimum amount of methanol, and ether was added into the solution until the solution became cloudy. Upon keeping the cloudy solution at −20° C. overnight, microcrystals of HC-n precipitated at the bottom of the glass container, and they were collected by filtration. The yields were generally over 60%. Results of elemental analyses, matrix-assisted laser desorption ionization time-of-flight (MALDI-TOF) mass spectral data, $^1$H and $^{13}$C NMR spectra, and Fourier-Transform infrared (FT-IR) spectra unambiguously confirmed the identities of HC-n dyes synthesized in these experiments.

Example II

Measurement of Hyperpolarizability ($\beta$) by Hyper Rayleigh Scattering

The $\beta_{HC-n}$ values for n=6, 12, and 22 were determined indirectly by comparing with that of PNA ($\beta_{PNA}$=34.5±4×10$^{-30}$ esu in methanol at 1064 nm), which has been measured most reliably.[23,24] For this, the intensities of the incoherent SH radiations of HC-n (n=6, 12, and 22) and PNA [denoted as $I_{out}$(HC-n) and $I_{out}$(PNA), respectively] were measured at various concentrations between 0.1 and 0.5 mM for HC-n and between 0.1 and 30 mM for PNA. The experimental setup is as follows: A rectangular quartz cuvette (path length=1 cm) containing a methanol solution of a NLO dye was placed along the beam path of a mode-locked Nd:YAG laser beam (1064 nm, 10 Hz repetition rate, 40-ps pulse width) 40 cm away from a focusing lens with the focal length of 50 cm. The cuvette was carefully positioned so that the beam can pass through the rightmost end of its front face to minimize absorption of the generated SH wave (532 nm) by the HC-n dyes whose absorption tails exceed 532 nm. The scattered incoherent SH radiation was collected with a lens facing the right hand side of the cuvette, and the collected beam was passed through a monochromator to select only SH radiation, and subsequently led to a photomultiplier tube (PMT).

Figure 1B:
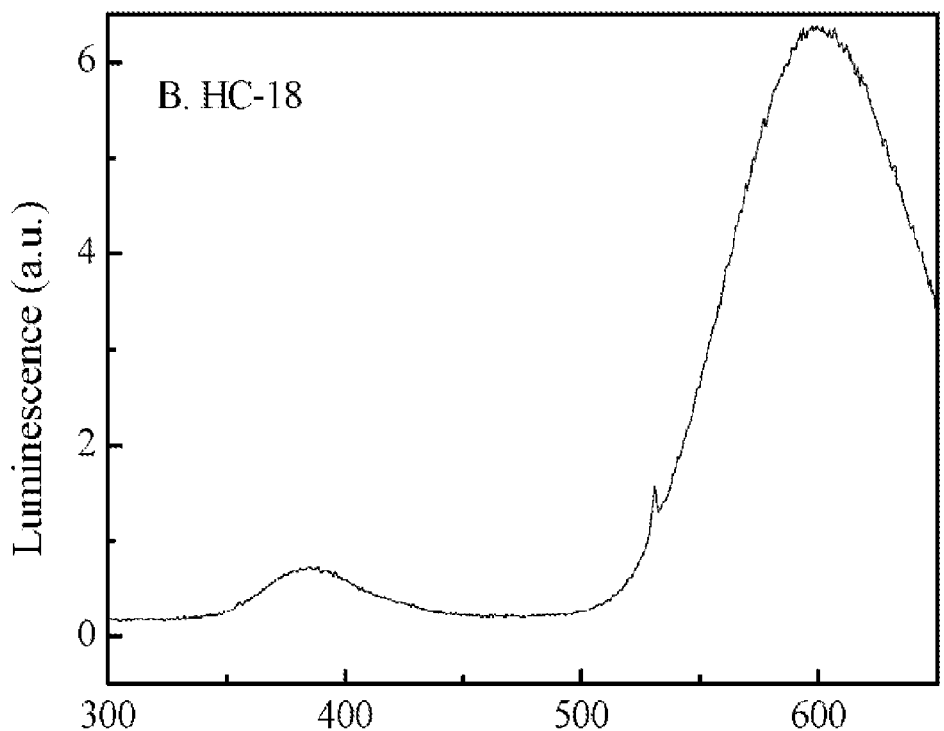
FIG. 1B represents the photoluminescence spectrum of the methanol solution of HC (hemicyanine)-18.
Figure 1C:
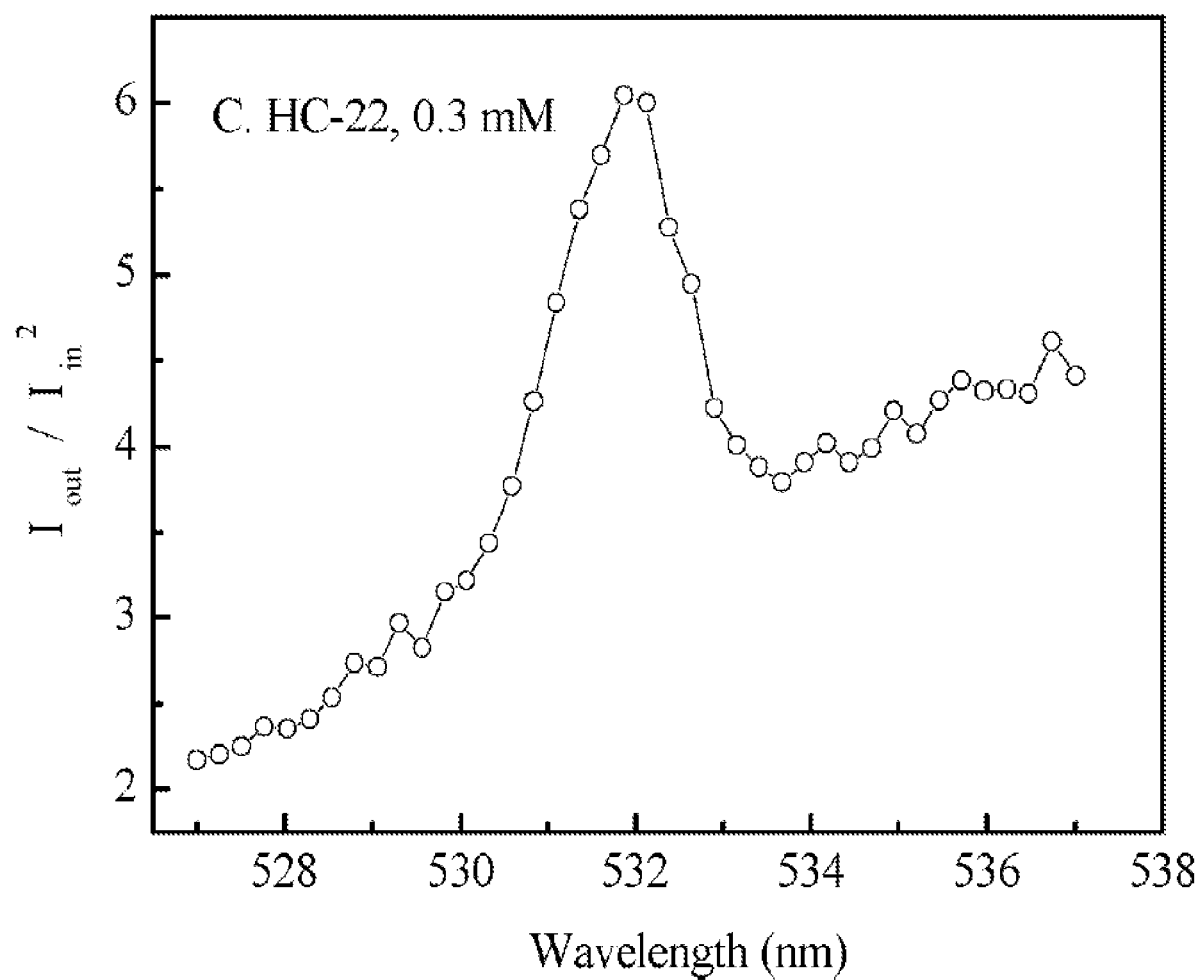
FIG. 1C represents the HRS signal of the methanol solution of HC-22 (0.3 mM) overlapping with the upper edge of the intense photoluminescence envelope (C), arising from irradiation of each sample with 1064-nm laser pulses.

FIG. 1A shows the HRS signal of PNA. The HC-n dyes produced very intense photoluminescence with the maximum at ~600 nm due to multiphoton absorption of the incident beam by the HC-n dyes as typically shown in FIG. 1B for the case of HC-18. As a results the HRS signals from HC-n dyes overlapped with the upper edge of an intense photoluminescence envelope as shown in FIG. 1C. Accordingly, only the SH signals were extracted from the backgrounds by deconvolution.

Example III

Preparation of Silicalite-1 Films

The growth of ZSM-5 and silicalite-1 films on porous substrates such as porous stainless steel, porous alumina, and porous Vycor glass disc and on nonporous substrates such as Teflon, silvers and silicon is well documented.[26] We therefore grew silicalite-1 and ZSM-5 films on flat glass by modification of the procedures and compositions of the synthesis gels described in the literature. For comparisons we also grew ZSM-5 films with several different Si/Al ratios on glass plates.

The growth of continuous silicalite-1 films over the glass plates was carried out by immersing 5 glass plates (25×70×1 mm$^3$) into the synthesis gel consisting of TEOS, TPAOH, and water in the mole ratio of 0.8:0.1:50, followed by heating at 140° C. for 5 hr in a Teflon-lined autoclave. The synthesis gel was prepared by introducing TEOS (28.3 g) into a plastic flask containing a TPAOH solution (150 ml, 0.11 M) with vigorous stirring. The gel was aged at room temperature for 12 hr with vigorous stirring and transferred to a Teflon-lined autoclave before immersion of glass plates. The obtained silicalite-1-coated glass plates (SL/Gs) were thoroughly washed with copious amounts of water and dried in the atmosphere at room temperature. The resulting SL/Gs were cut into four pieces with the size of ~25×18×1 mm$^3$ and they were calcined at 450° C. for 12 hr to remove TPA template prior to inclusion of NLO dyes. The thickness of each silicalite-1 film was monitored by taking the scanning electron microscope (SEM) images of the cross sections. Films with higher thickness ($\geqq$~1 μm) were also prepared by either increasing the immersion time in the synthesis gel or re-immersing the glass plates coated with zeolite films into a fresh gel for a desired length of time.

ZSM-5 films with several different Si/Al ratios (50, 25, and 17) have also been grown on glass plates by modification of the gel compositions. The gel compositions were TEOS: NaAlO$_2$:TPAOH:H$_2$O=7:0.14:1:300, 7:0.28:1:300, and 7:0.42:1:300, respectively. The aging period and reaction temperature were fixed to be 5 hr and 180° C., respectively, and the reaction periods were 4, 4.3, and 5 hr, respectively. The Si/Al ratios of the ZSM-5 films were determined with energy dispersive X-ray analysis (EDX) of the films.

Example IV

Incorporation of HC-n into SL/G and ZSM-5 Films

Into each vial (25 ml capacity) containing a methanol solution of different HC-n (10 ml, 1 mM) two SL/Gs were added, and the vial was kept at room temperature for a desired period of time such as 1 day, 1 week and 3 weeks. After equilibration, the SL-Gs were removed from the solution and washed with copious amounts of fresh methanol, and dried in the air. For comparison of the SHG activities, SL/Gs from the same batch were used so that the characteristic factors of the film, such as the thickness, the degree of the coverage of the glass with silicalite film, the orientation of the film and the morphology of the film were as similar as possible. Furthermore, we took out a small portion from each SL/G, and analyzed the characteristic factors of the films with SEM to ensure that the above factors are indeed similar from one sample to another and to discard any SL/Gs having significantly different factors from the average values.

Similarly, HC-18 was included into ZSM-5 films with the Si/Al ratios of 50 and 25, respectively.

Example V

Quantitative Analysis of the Incorporated Amounts of HC-n in HC-n-SL/G

The HC-n dyes incorporated in SL/Gs were quantitatively analyzed according to the following procedure. A dilute aqueous solution of hydrofluoric acid (1 ml, a mixture of 0.2 ml of 49% HF and 0.8 ml of distilled deionized water) was introduced into a 50-ml plastic flask containing a HC-n-SL/G. After gentle swirling of the mixture for 5 min at room temperature, the solution was neutralized by adding aqueous NaOH solution (1 ml, 5 M). Methanol (8 ml) was subsequently added into the neutral solution to ensure dissolution of all the dye into the solution. After removal of the clean glass substrate from the solution, the solution was centrifuged to precipitate silica particles. The clean supernatant solution was decanted into one of the matched pair of quartz cell for a spectroscopic measurement. To increase accuracy in the quantitative analysis, we independently determined the molar extinction coefficient of each HC-n at the concentration similar to that of the extracted solution. Subsequently, knowing that the unit cell dimension of (010) plane is $2.007 \times 1.342$ nm$^2$ and each unit cell contains two straight channels[27], the number of straight channels in each SL/G was deduced by dividing the area of each SL/G ($\sim 25 \times 18$ mm$^2$) with $2.007 \times 1.342$ nm$^2$ and taking the fact that a SL/G has two films into account.

Example VI

Measurement of SH Intensity of HC-n-SL/G

As an index matching fluid, a drop of DMSO was dropped onto each side of a HC-n-SL/G, respectively, and each side of the HC-n-SL/G was covered with a clean bare glass plate ($25 \times 18 \times 1$ mm$^3$). This was necessary to avoid scattering of the incident laser beam caused by the irregular thickness of the silicalite-1 films. A beam splitter and a photodiode were used to compensate for the intensity fluctuations of the fundamental beam (1064 nm). The polarity of the fundamental laser beam was adjusted using a half-wave plate before it hit the sample. The electric field vector of the incident beam was either parallel (p-polarization) or perpendicular (s-polarization) to the plane of incidence. Only the p-polarized SH beam was made to enter a PMT by using a prism and a SH pass filter. An analyzer was used to confirm the polarization direction of the SH signal. A HC-n-SL/G was mounted on the rotator coupled to a step motor. The output signals from the photodiode and PMT were detected as a function of an incident angle. A 3-mm-thick Y-cut quartz crystal (a piece of quartz plate whose plane is perpendicular to the crystalline y-axis and the thickness of the plate is 3 mm. See FIG. SI-2 in the Supporting Information)[28] was used as a reference for determining the relative intensities of the SH signals generated from the samples. The SH signals were collected from three different spots of a HC-n-SL/G, and the average intensity was taken.

Example VII

Instrumentation

SEM images of zeolites and the zeolite-coated glass plates were obtained from a FE-SEM (Hitachi S-4300) at an acceleration voltage of 20 kV. A platinum/palladium alloy (in the ratio of 8 to 2) was deposited with a thickness of about 15 nm on top of the samples. The EDX analysis of the samples was carried out on a Horiba EX-220 Energy Dispersive X-ray Micro Analyzer (Model: 6853-H) attached to the above FE-SEM. The X-ray diffraction patterns for the identification of the zeolite films were obtained from a Rigaku diffractometer (D/MAX-1C) with the monochromatic beam of Cu K$\alpha$. The UV-vis spectra of the samples were recorded on a Shimadzu UV-3101PC. FT-IR spectra were recorded on a Jasco FT/IR 620. $^1$H and $^{13}$C NMR spectra of the HC-n dyes were obtained from a Varian Jemini 500 NMR spectrometer. Elemental Analyses of the HC-n dyes were performed on a Carlo-Erba EA1108. Mass spectral data were obtained from an Applied Biosystem MALDI TOF mass spectrometer (Proteomics Solution I Voyager-DE STR). Quantitative analysis of the included amount of n-octadecane into silicalite-1 was performed on a Hewlett Packard 6890 series gas chromatograph equipped with a flame ionization detector. The fundamental laser pulses (1064 nm, 40-ps pulse width, and 10-Hz repetition rate) were generated from a Continuum PY61 mode-locked Nd-YAG laser.

Results

Characteristics of SL/G and ZSM-5 Films

Figure 2A:
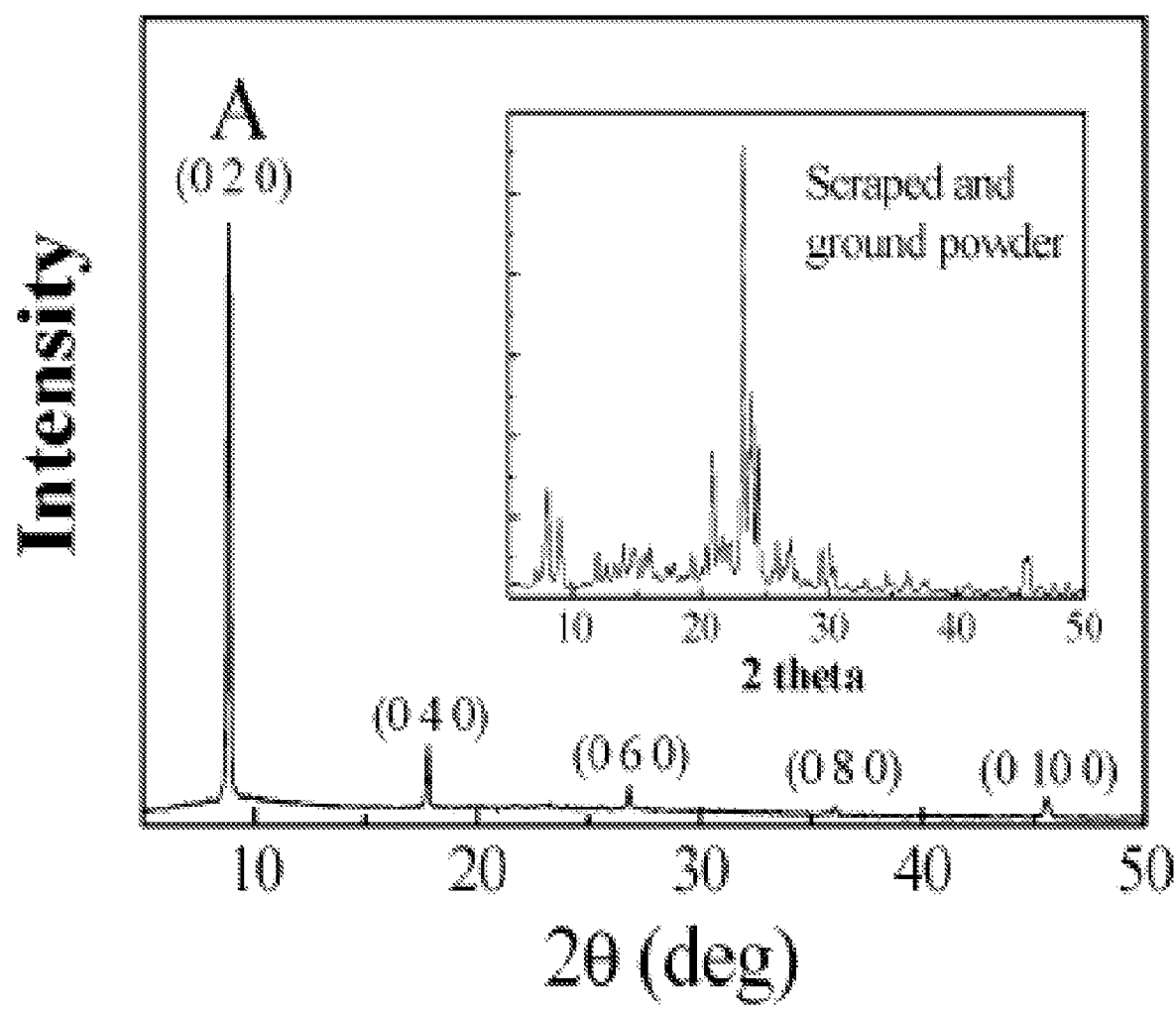
FIGS. 2A-2C show a typical X-ray diffraction pattern (FIG. 2A) and the SEM images (FIG. 2B; cross sections FIG. 2C; top view) of SL/G showing the alignment of the b-axis of the silicalite-1 film perpendicular to the glass plane. The inset in FIG. 2A shows the X-ray powder diffraction pattern of the silicalite-1 powders which was obtained by finely grinding the film that was collected by scrapping the SL/G.

Silicalite-1 films readily grew on both sides of glass plates with their b-axes (straight channels) orienting perpendicular to the glass planes. Thus, as shown in FIG. 2A, the diffraction lines appeared at a regular interval ($2\theta = 8.85$, 17.8, 26.85, 34.85, and 45.55°) corresponding to (0 2 0), (0 4 0), (0 6 0), (0 8 0), and (0 10 0) planes of the crystals. In order to make sure that the above regularly spaced X-ray diffraction pattern arises not due to the formation of an unknown zeolite film but due to the orientation of the silicalite-1 film with the b-axis perpendicular to the glass plane, the films were scraped off the glass plates, and ground into fine powders to analyze the nature of the film.

Figure 2B:
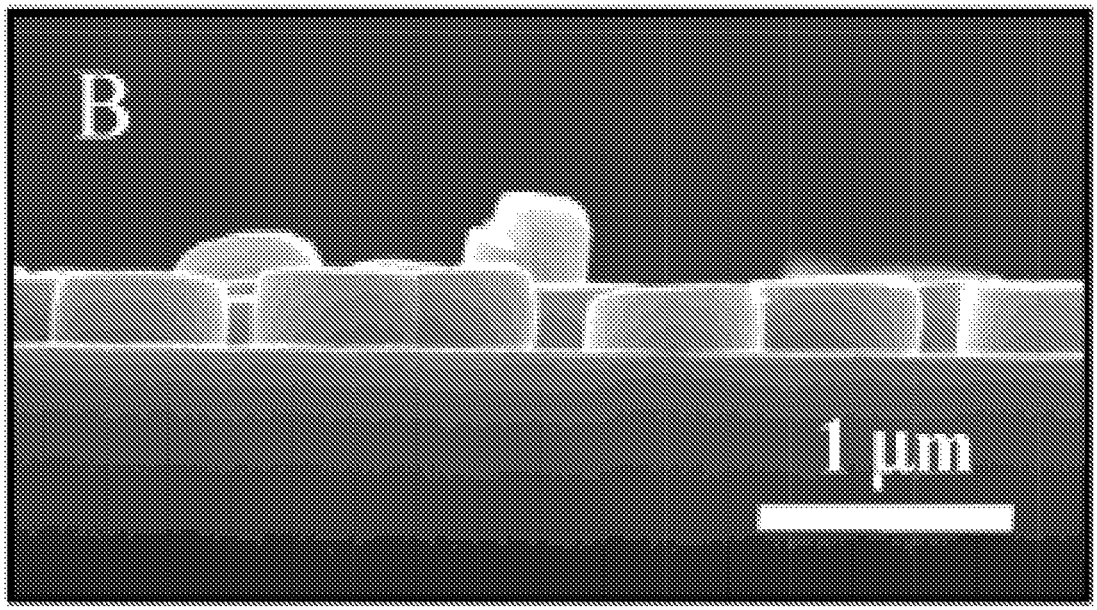

The X-ray diffraction pattern of the powders revealed that the film is indeed comprised of pure silicalite-1, as shown in the inset of FIG. 2A. The SEM images shown in FIGS. 2B,C further confirmed that the silicalite-1 films are oriented with b-axes perpendicular to the substrate planes. The film thickness significantly varied depending on the batch. Although slightly, the thickness also varied within a film depending on the spot. The typical thicknesses were 400-500 nm, and the film thickness of the SL/G used in this report was about 400 nm.

The quality of the film became inferior with increasing the Al content in the gel. Consequently, the degree of the area of the glass plate covered by the b-oriented MFI-type film (with respect to the total area of the glass plate) decreased with increasing the Al content, i.e., they were 93, 81, and 57% for the films with the Si/Al ratios of $\infty$, 50, and 25, respectively. Under the experimental conditions described previously, the film thicknesses of the ZSM-5 films were also about 400 nm.

$\beta_{HC\text{-}n}$ for n=6, 12, and 22

The plots of the ratio between the SH intensity ($I_{out}$) and the square of the incident beam intensity ($I_w^2$), i.e., $I_{out}/I_w^2$, with respect to the concentration was made for PNA and HC-n (n=6, 12, and 22), respectively (FIG. 4). As shown in FIG. 4, the $\beta_{HC\text{-}n}$ values are essentially identical regardless of n. By applying the reported value of $\beta_{PNA}$ ($34.5 \pm 4 \times 10^{-30}$ esu),[23,24] the $\beta_{HC\text{-}n}$ values were determined to be $765 \pm 89 \times 10^{-30}$ esu at 1064 nm. The above $\beta_{HC\text{-}n}$ values are similar to the one reported by Ashwell et al[4].

Length of HC-n and Incorporated Numbers of HC-n per Channel ($N_C$) of Silicalite-1 and ZSM-5 Films The included number of each HC-n molecule per channel ($N_C$) after dipping a SL/G in 1 mM solution of each HC-n for 1 week is listed in Table 1. As noticed, $N_C$ increased upon increasing n from 3 to 6 but rapidly decreased upon further increasing n. Interestingly, $N_C$ of HC-18 into Na-ZSM-5 films increased with increasing the Al content. For instance, whereas the $N_C$ of HC-18 into an SL/G was 3.5 (Table 1) the corresponding numbers into Na-ZSM-5 films (Si/Al=50 and 25) were 3.9 and 4.4, respectively. We attribute the above phenomenon to the ion exchange-aided incorporation of the positively charged HC-18 dye into the negatively charged channels by ion exchange of $Na^+$.

TABLE 1

Effect of alkyl chain length (n) on the optical properties of HC-n and the amount of inclusion

| n  | $Nc^a$ | $Ipp^b$ | $Isp^c$ ($\times 10^{-4}$) | $d_{33}{}^d$ | $d_{31}{}^e$ | $d_{33}/d_{31}$ | $d_{33}/Nc$ | $DUA^f$ |
|----|------|------|-------|------|------|-----|------|------|
| 3  | 6.4  | 0.3  | —     | 1.12 | —    | —   | 0.18 | 0.08 |
| 6  | 23.1 | 0.1  | —     | 0.50 | —    | —   | 0.02 | 0.01 |
| 9  | 15.4 | 1.6  | 0.5   | 2.25 | 0.02 | 113 | 0.15 | 0.09 |
| 12 | 8.2  | 3.8  | 2.2   | 3.59 | 0.04 | 90  | 0.63 | 0.20 |
| 15 | 5.7  | 7.0  | 1.7   | 4.99 | 0.04 | 125 | 0.88 | 0.38 |
| 18 | 3.5  | 7.9  | 3.0   | 5.30 | 0.05 | 106 | 1.51 | 0.66 |
| 22 | 0.9  | 0.9  | 0.4   | 1.71 | 0.02 | 86  | 1.90 | 0.91 |
| 24 | 1.2  | 1.9  | 0.9   | 2.57 | 0.03 | 86  | 2.14 | 0.95 |

$^a$Number of HC-n in each channel of silicalite-1 film.
$^{b,c}$In % with respect to that of an Y-cut 3 mm thick quartz crystal.
$^{d,e}$In pm $V^{-1}$.
$^f$The degree of uniform orientation of HC-n, defined by the experimental-to-theoretical ratio of $d_{33}$ values, $d_{33}(E)/d_{33}(T)$.

Irreversible Inclusion of HC-n into Silicalite-1 Channels

Figure 3:
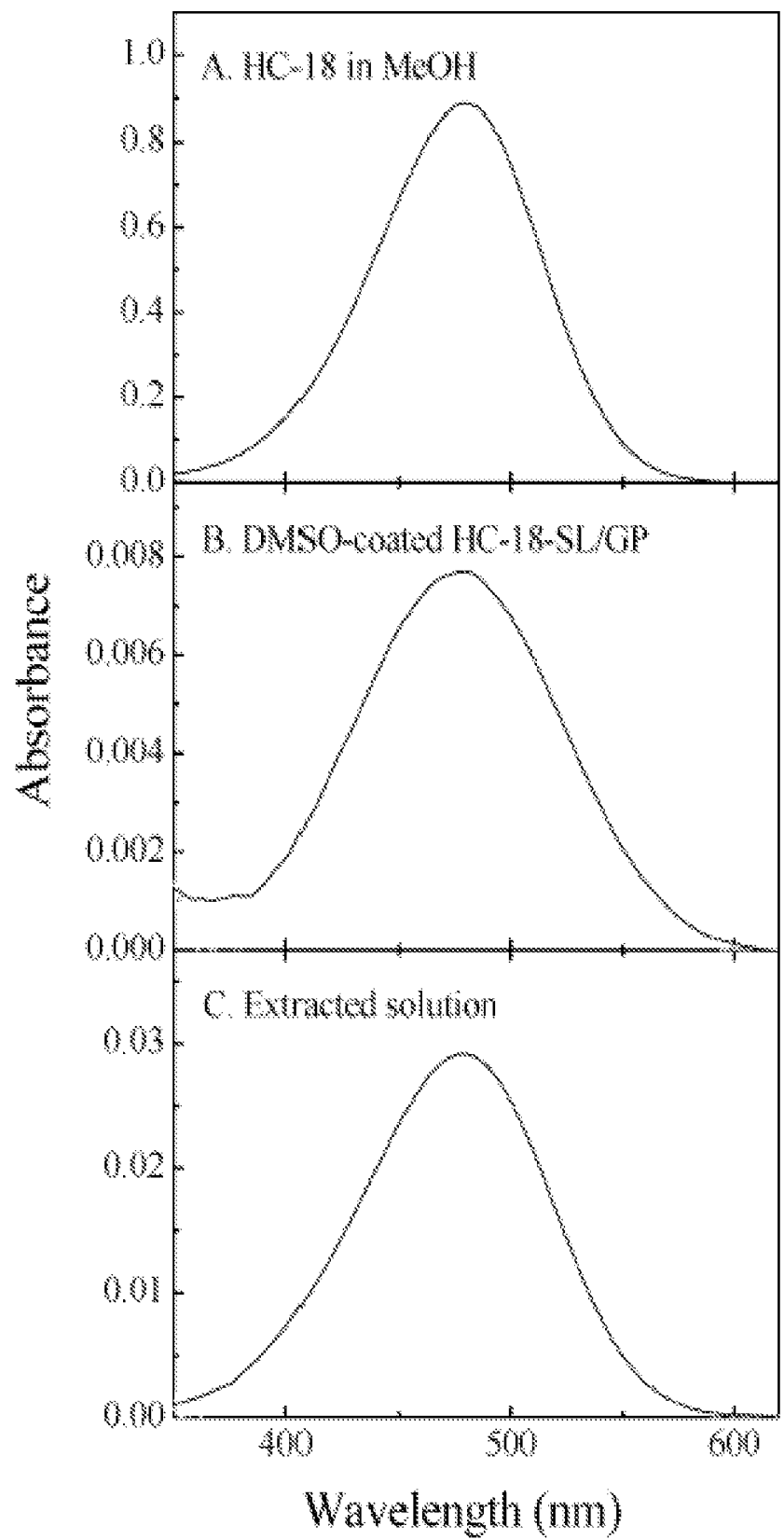
FIG. 3 represents the UV-vis spectra of 0.02 mM HC-18 in methanol (A), HC-18-SL/GP coated with DMSO as the refractive index matching fluid (B), and the aqueous methanol solution of HC-18 extracted from HC-18-SL/GP (C).
Figure 4A:
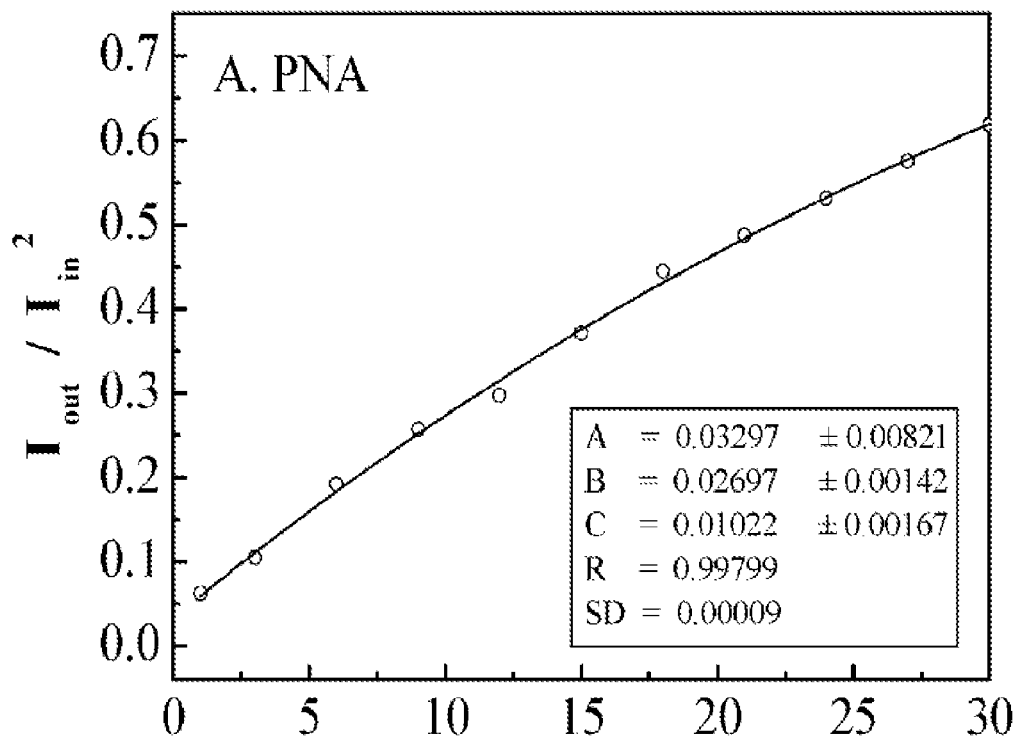
FIGS. 4A-4D show the plots of the intensities of the incoherent SH (second harmonic) radiations ($I_{out}$) of PNA (FIG. 4A) and HC-6 (FIG. 4B), HC-12 (FIG. 4C) and HC-22 (FIG. 4D) with respect to the concentrations of the dye.
Figure 4B:
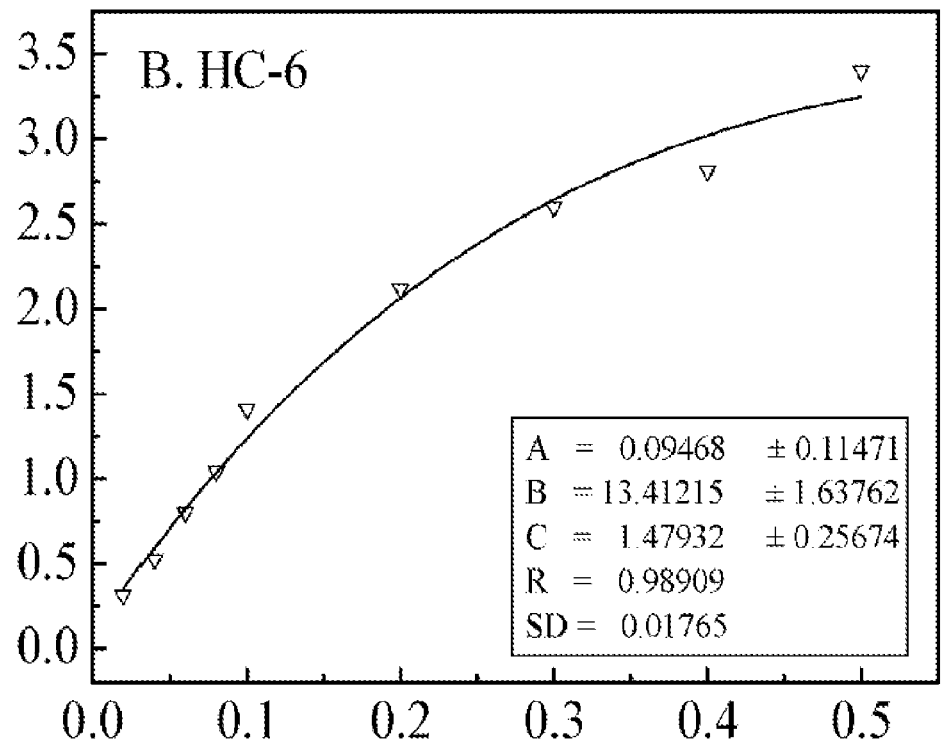
Figure 4C:
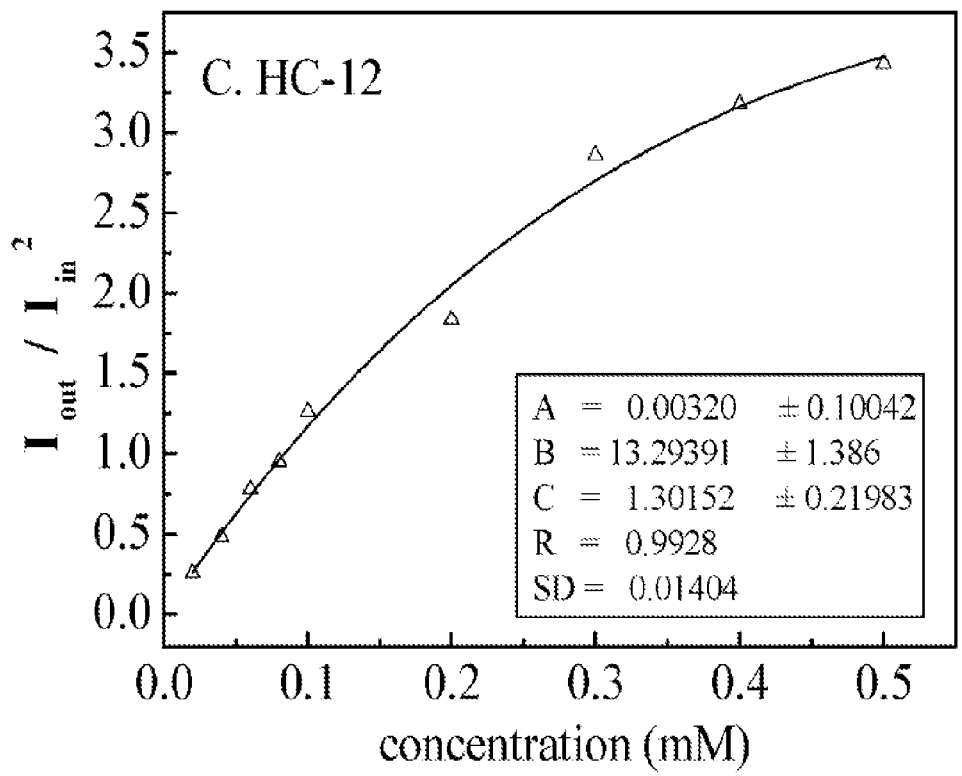
Figure 4D:
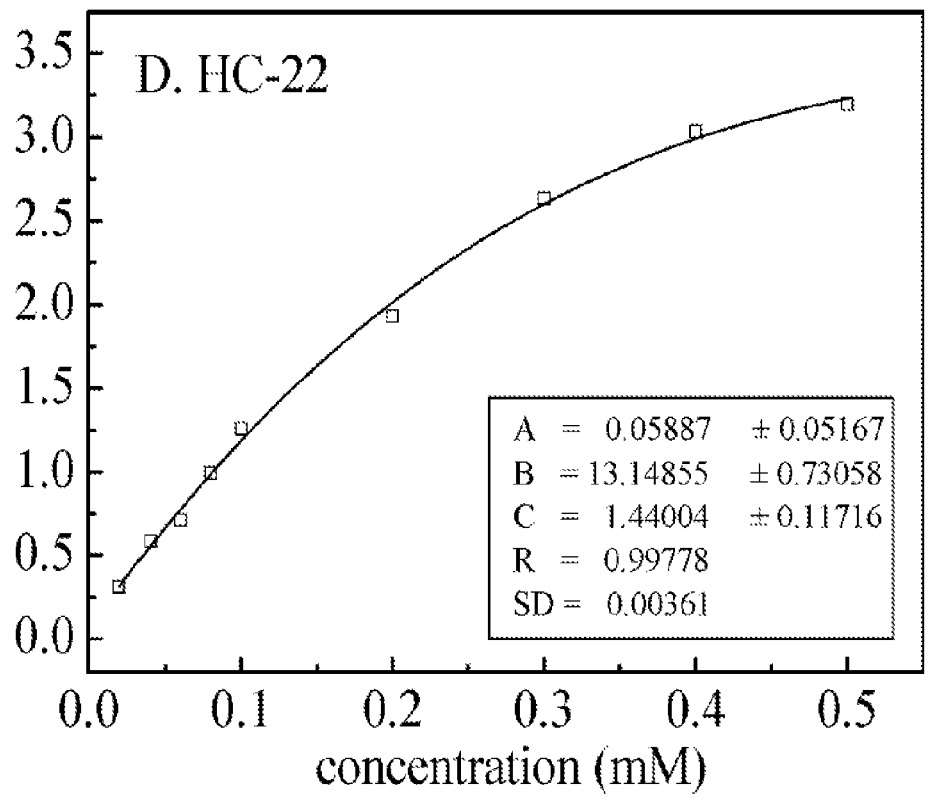
Figure 5:
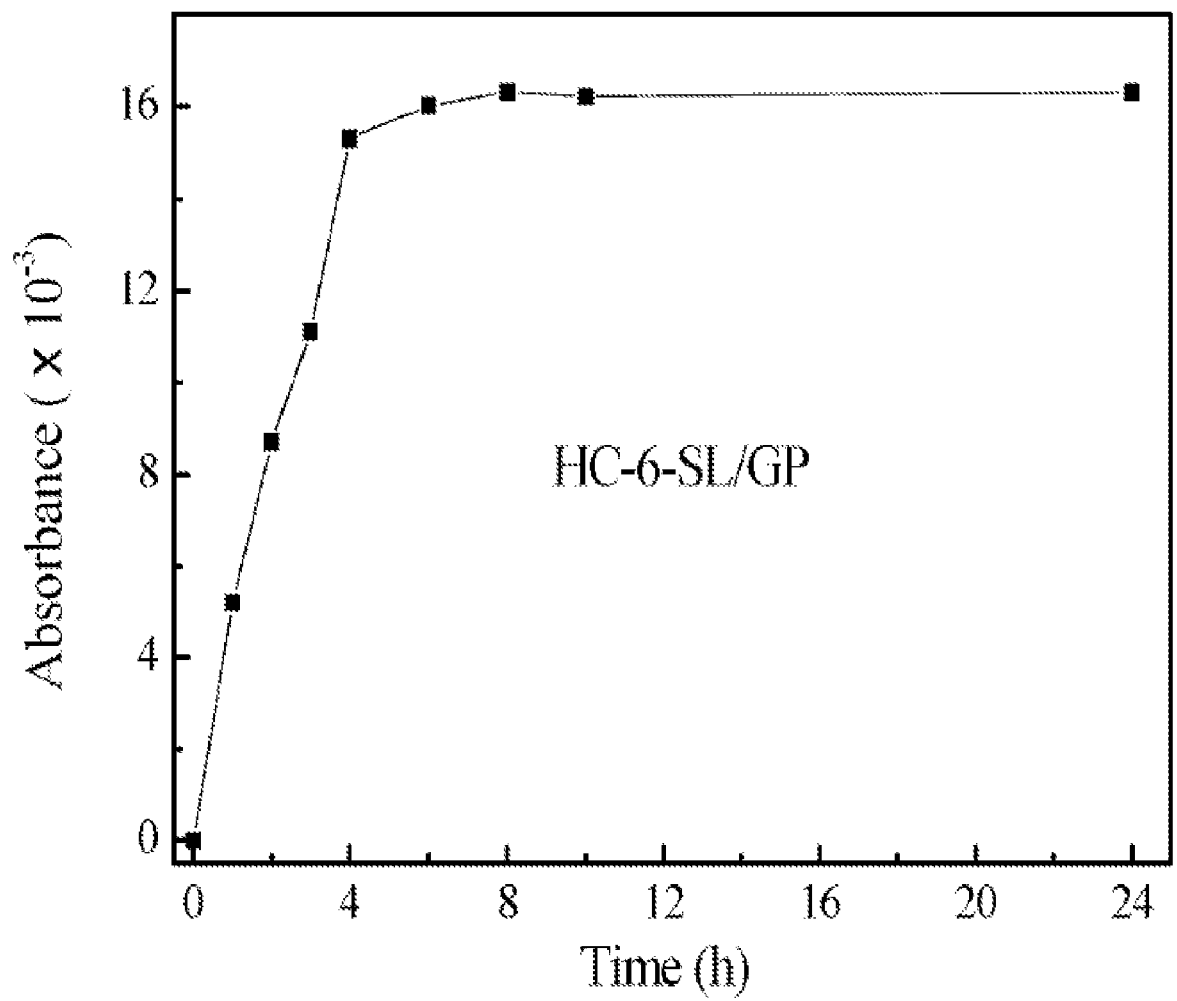
FIG. 5 represents the change of the absorbance of the supernatant solution of HC-6 (1 mM) after immersion of a SL/G at 479 nm with time.

The colorless SL/Gs, slowly picked up pink hue upon immersion into methanol solutions of HC-n. The ready inclusion of HC-n into SL/Gs was confirmed by the UV-vis spectra of the DMSO-coated HC-n-SL/Gs, which were identical with the spectrum of HC-n in methanol, as typically shown in FIG. 3B for HC-18. In the case of HC-6 with the largest $N_C$, we monitored the amount of inclusion of the dye into a SL/G with time (FIG. 5). The result showed that the rate of inclusion was high before 4 hr but decreased significantly after 4 hr.

Interestingly, if the dyes had once entered the silicalite channels, they never came out of the channels into solution. For instance, the intensities of the visible bands of HC-3-SL/G and HC-18-SL/Gs at 479 nm did not decrease even after keeping them in fresh methanol for 3 days, and the UV-vis spectra of the supernatant solutions also did not show any indication of leaching of HC-3 and HC-18 from silicalite-1 to methanol. The above result shows that the silicalite-1 channel has a very strong affinity toward HC-n dyes regardless of the chain length, indicating that inclusion of HC-n into the silicalite-1 channel is a non-equilibrium, irreversible process.

In contrast to the case of HC-n-SL/Gs, 29% of the included HC-18 was extracted from the ZSM-5 film (Si/Al=50) to the solution upon immersion into 1 M $NaClO_4$ in methanol solution for 24 hr. The result shows that most of the HC-n cations are included into ZSM-5 channels via ion exchange.

$I_{2w}$, $d_{33}$ and $d_{31}$ of HC-n-SL/G

Figure 6A:
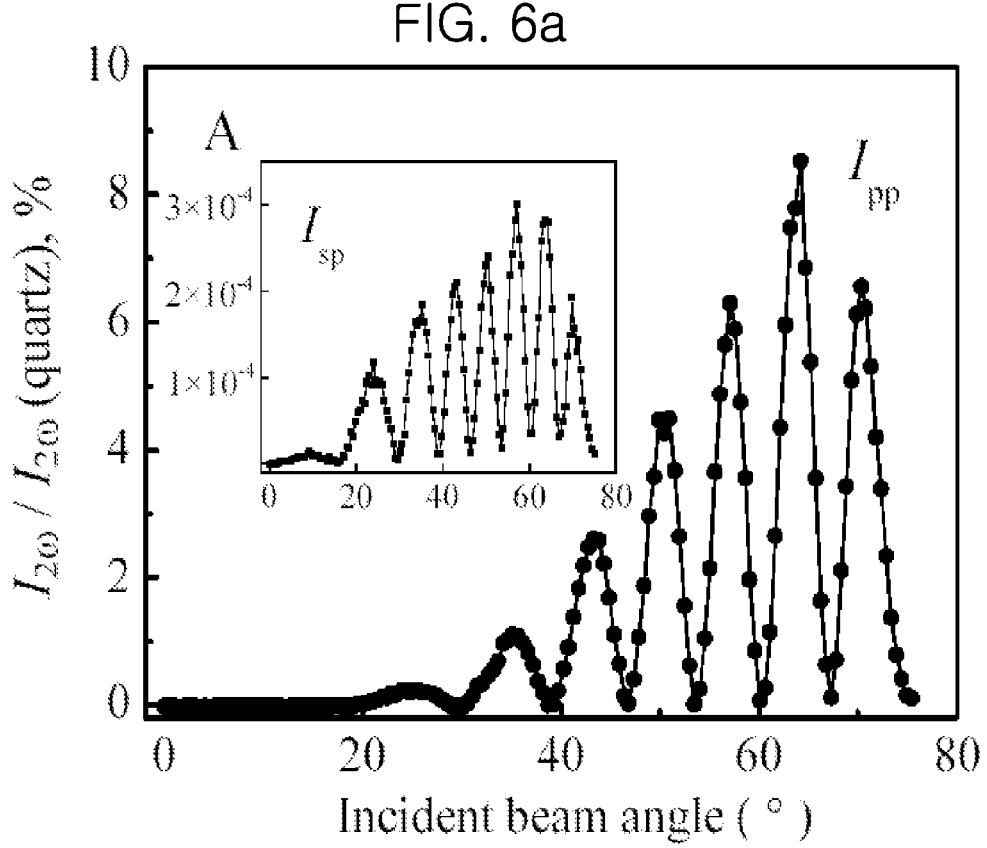
FIGS. 6A-6D represent the plots of $I_{pp}$ and $I_{sp}$ (inset) of HC-18-SL/G (in %, with respect to the corresponding value of Y-cut 3 mm quartz) versus the angle of the incident beam (FIG. 6A) and the plots of $d_{33}$ (FIG. 6B), $d_{33}/N_C$ (FIG. 6C), and $d_{33}(E)/d_{33}(T)$ (FIG. 6D) versus n.

The relative $I_{2w}$ (expressed in % with respect to an Y-cut 3-mm thick quartz) are more specifically expressed as $I_{pp}$ and $I_{sp}$, depending on the polarization direction of the incident beam, where the former and the latter denote the intensities of p-polarized SH beams generated from the p- and s-polarized fundamental laser beam, respectively. The typical plot of $I_{pp}$ and $I_{sp}$ of HC-18-SL/G versus the angle of the incident beam (with respect to the surface normal) is shown in FIG. 6A. All the other HC-n-SL/Gs showed nearly identical profiles. The complete destructive interferences in the profiles indicate that the two silicalite-1 films on the opposite sides of glass plates are nearly identical. The average angles at which the maximum values of $I_{pp}$ and $I_{sp}$ appeared were 67.4° and 55.9°, respectively.

Figure 2C:
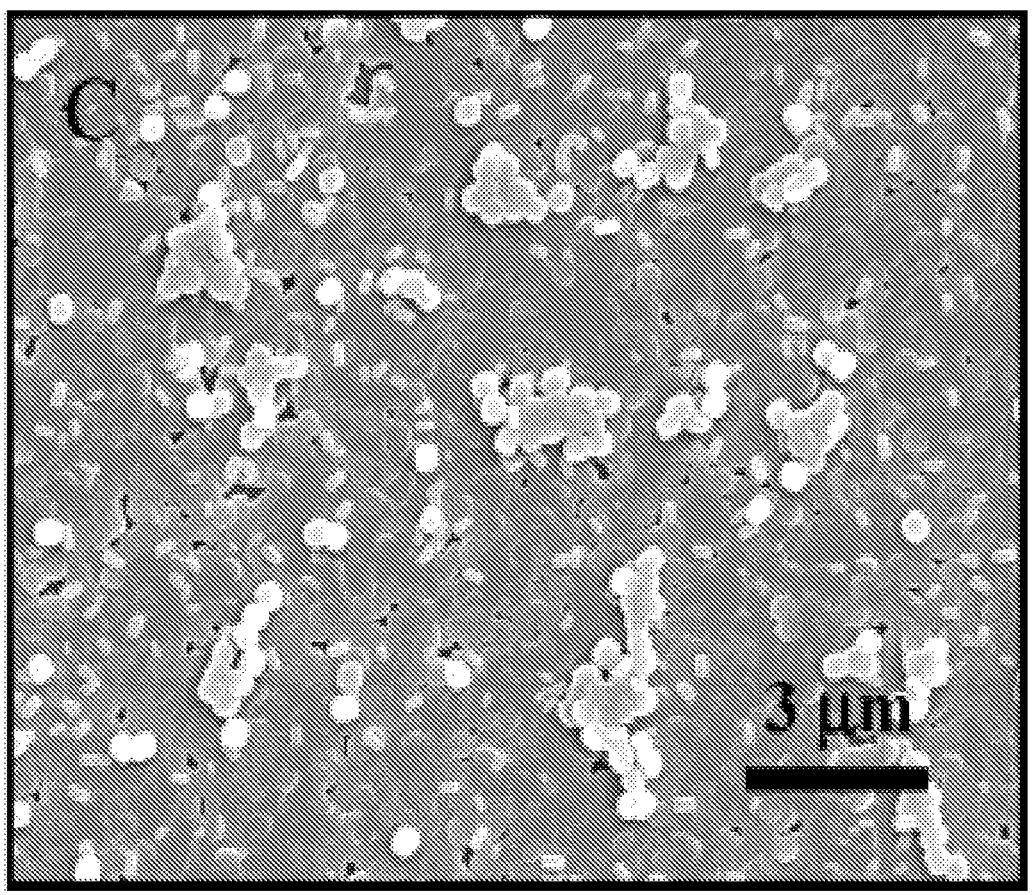

The $I_{pp}$ values ranged from 0.3 to 7.9% while those of $I_{sp}$ ranged from $0.4 \times 10^{-4}$ to $3.0 \times 10^{-4}$% (Table 1). The fact that the observed $I_{pp}$ values are about $10^4$ times larger than the $I_{sp}$ values indicates that most of the dyes are positioned vertically with the long axis perpendicular to the glass plane, consistent with the aforementioned fact that most of the straight channels are oriented vertically with respect to the glass plane (FIG. 2).

In general, the $I_{pp}$ values of HC-n-SL/Gs were relatively small when $n \leq 6$ than when $n \geq 9$. Although the difference was small, $I_{pp}$ tended to decrease from 0.3 to 0.1 upon increasing n from 3 to 6 despite the fact that Nc increased by about 4-fold. This result suggests that HC-6 enters silicalite-1 channels with a more random orientation than HC-3. However, $I_{pp}$ progressively increased from 0.1 to 7.9% with increasing n from 6 to 18, despite the progressive decrease in $N_C$. Interestingly, consistent with the sharp decrease of $N_C$, $I_{pp}$ sharply decreased from 7.9 to 0.9 and 1.9% upon further increasing n from 18 to 22 and to 24. Although small, the $I_{sp}$ value also showed a similar trend with that of $I_{pp}$ with increasing n.

Figure 6B:
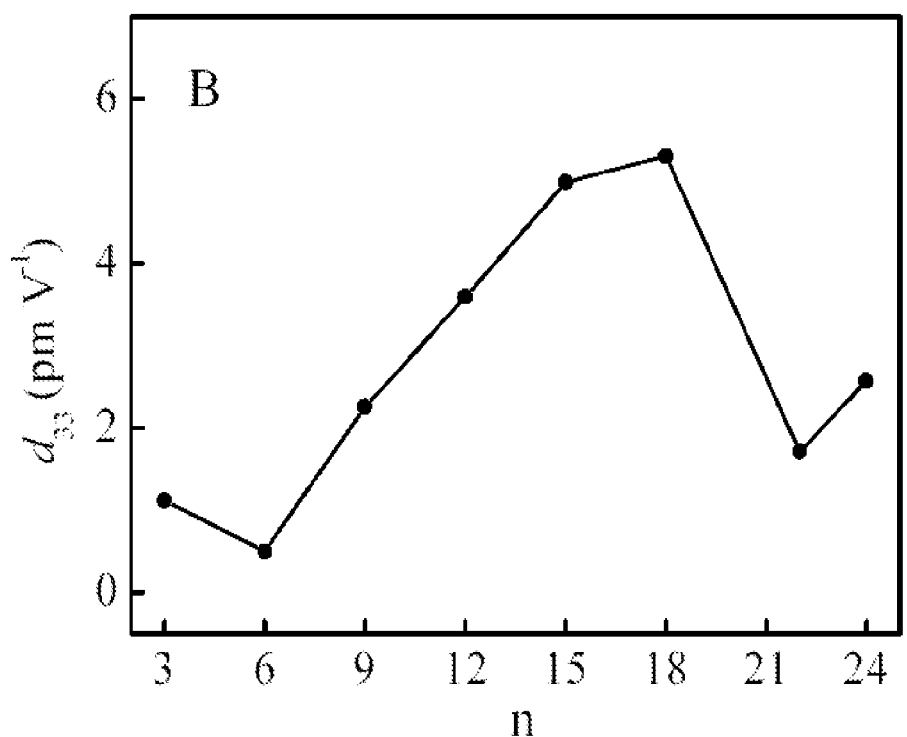
Figure 6C:
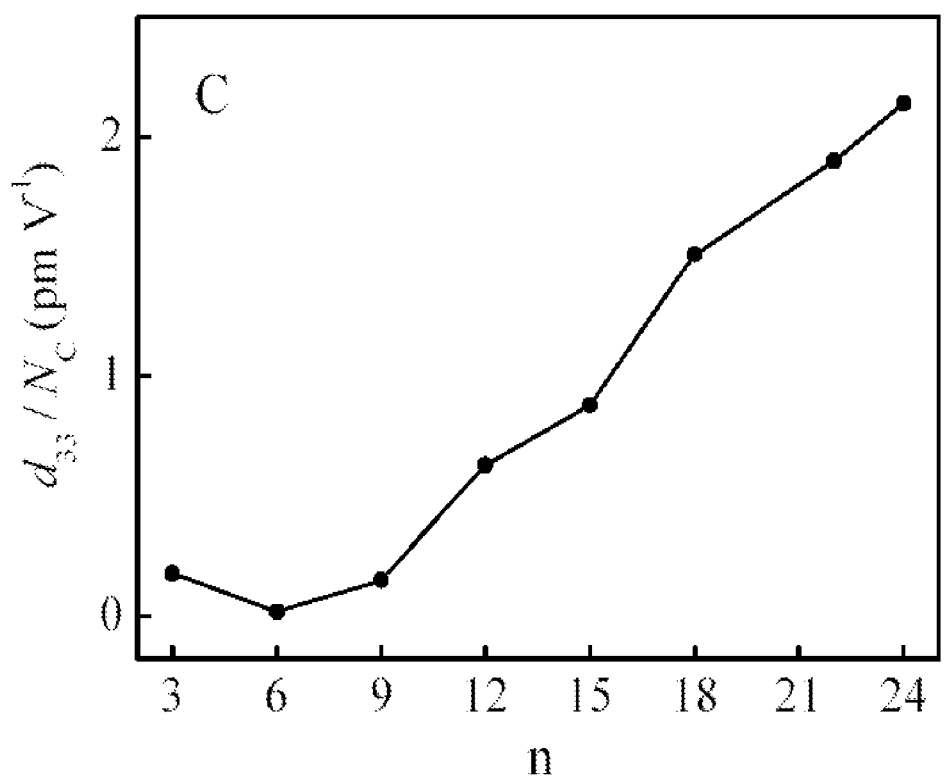

The two tensor components of quadratic nonlinear susceptibility, $d_{33}$ and $d_{31}$ of HC-n-SL/Gs, were determined with the Maker's fringe method[25] by comparing the experimentally observed relative $I_{pp}$ and $I_{sp}$ values with the intensity of a 3-mm thick Y-cut quartz whose $d_{11}$ is 0.3 $pmV^{-1}$. For this, 1.48 was used as the refractive index of silicalite-1 film based on the fact that DMSO can serve as a good index matching fluid, whose refractive index is 1.48 at 20° C. The values are listed in Table 1, and graphically displayed in FIG. 6B. Like $I_{pp}$, the $d_{33}$ value initially decreased with increasing n from 3 to 6, but progressively increased with increasing n from 6 to 18, but sharply decreased upon further increasing n. However, $d_{33}/N_C$ progressively increased with increasing n (Table 1 and FIG. 6C). The above results are highly reproducible even with other batches of SL/Gs. We propose that the above phenomenon arises as a result of the increase in the tendency of HC-n molecule to enter the hydrophobic silicalite-1 channels with the hydrophobic tail first as the tail length increases.

The $I_{pp}$ values observed from HC-18-loaded ZSM-5 films were 1.7 and 0.5%, respectively. Obviously, the $I_{pp}$ values are much smaller than that of HC-18-SL/G (7.9%) despite the fact that $N_C$ values are higher in the ZSM-5 films than in SL/G. One obvious factor that caused the $I_{pp}$ values to be lower than that of HC-18-SL/G is poorer coverage of glass plates with b-oriented films. However, even after taking the lower coverage of ZSM-5 films (Si/Al=50) on glass plates (81%) into consideration, the resultant $I_{pp}$ value is much too lower than the expected value. This phenomenon seems to occur due to the increase in the degree of randomly oriented incorporation of HC-18 into the channels of ZSM-5 due to the increase in the hydrophilicity of the channels as a result of introduction of anionic centers in the framework and the charge-balancing cations. Based on the above observation, we rather concentrated on aligned incorporation of HC-n dyes into SL/Gs.

The calculated $d_{33}/d_{31}$ ratios were always higher than 85, and the average was 109, which is about 2-5 times higher than those of Langmuir-Blodget (LB) films of nonlinear optical (NLO) dyes, which are about 30-50 times higher than those of poled polymers imbedded or grafted with NLO dyes. The estimated average tilted angle of HC-n ($\theta$) in the silicalite-1 channel based on the above very high average $d_{33}/d_{31}$ ratio was 7.7°, indicating that the long axes of the hemicyanine heads are tilted by the angle from the direction of the straight channels of silicalite-1 film (surface normal).

The degree of orientational order of nonlinear chromophores can be quantified by the order parameter s which is expressed by the following equation.

$$s = [3\langle \cos^2 \theta \rangle - 1]/2$$

From the derived average θ of 7.7°, the average order parameter (s) of HC-n in SL/Gs becomes 0.97, which is markedly higher than those of NLO dyes in poled polymers whose typical values are about 0.3. We believe that s of HC-n in SL/Gs is highest ever found among the materials comprised of organic DNLO dyes.

$$d_{33} = N\beta_{HC-n}\langle\cos^3\theta\rangle l^3 \tag{1}$$

$$d_{31} = N\beta_{HC-n}[\langle\cos\theta\rangle - \langle\cos^3\theta\rangle]l^3/2 \tag{2}$$

Figure 6D:
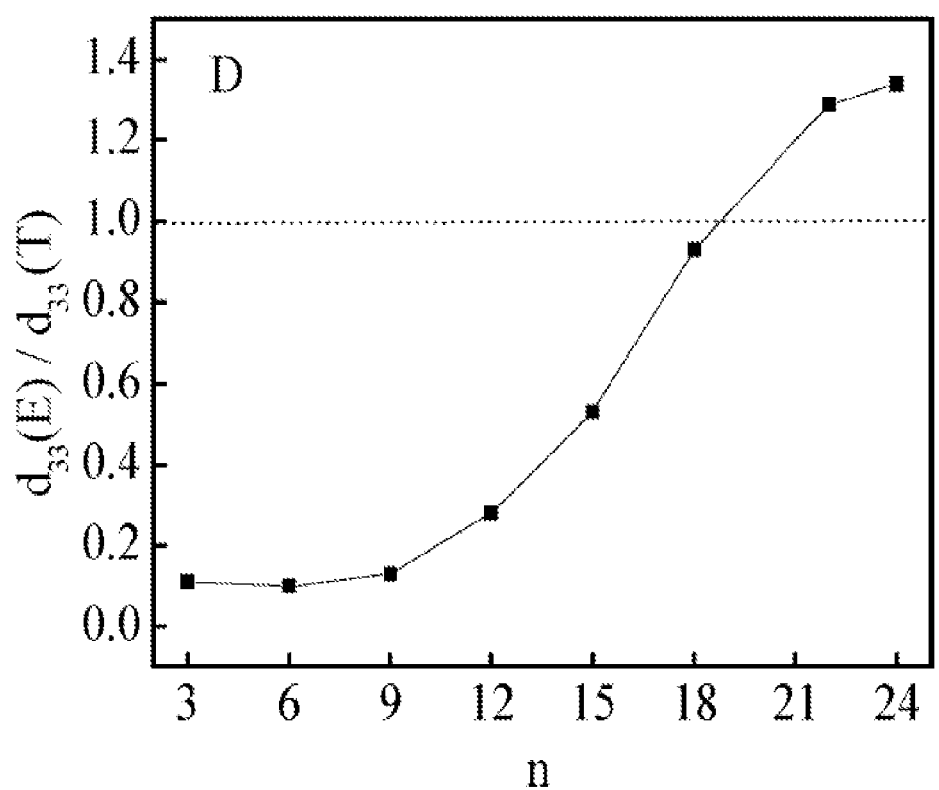

Marked Increase in the Degree of Uniform Alignment (DUA) of HC-n with Increasing n We calculated the maximum theoretical $d_{33}$ values based on the above equation 1 by taking the thickness of silicalite films, N (number) of DNLO and the β value of DNLO. The calculated theoretical $d_{33}$ values were 14.40 (3), 70.71 (6), 24.48 (9), 18.13 (12), 13.31 (15), 8.03 (18), 1.88 (22) and 2.71 pm/V (24), respectively, for each n shown in the parenthesis. The experimental-to-theoretical ratio of $d_{33}$ [$d_{33}$(E)/$d_{33}$(T)] is defined as DUA. The DUA values are listed in Table 1 and they are plotted against n in FIG. 6D. As noticed, DUA generally increased with increasing n. We propose that such a phenomenon arises as a result of the increase in the tendency of HC-n molecule to enter the hydrophobic silicalite-1 channels with the hydrophobic tail first as the tail length increases. The same proposal was made to account for the progressive increase of $d_{33}/N_C$ with increasing n.

The comparison of the smallest and the largest DUA values, i.e., 0.01 for n=6 and 1.34 for n=24, revealed the remarkable fact that the increase in n leads to as much as 98-fold increases in DUA. As noticed, the maximum DUA value came out somewhat lower than 1, demonstrating that the theoretical value match very closely with the experimental value.

Figure 7:
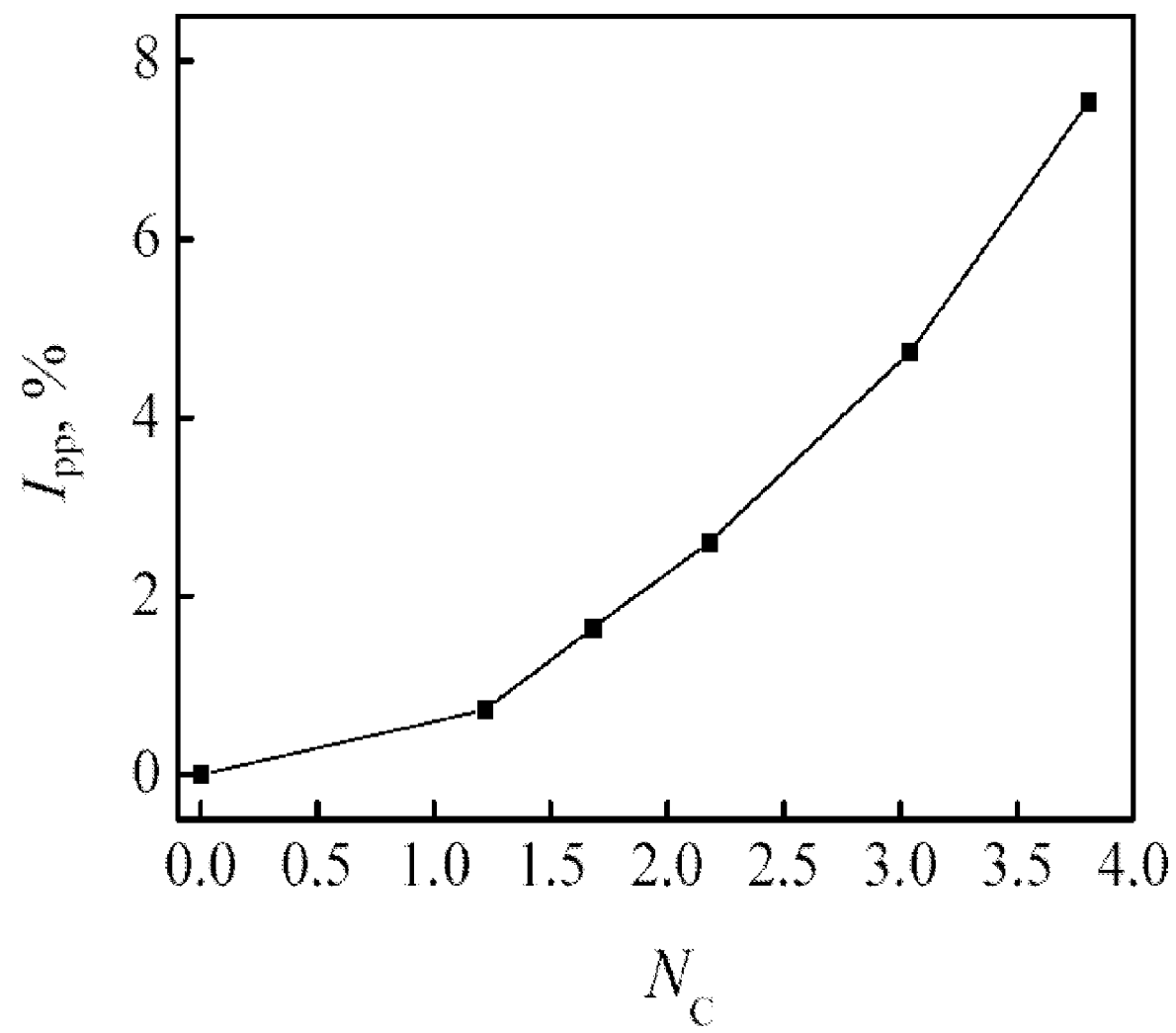
FIG. 7 represents the parabolic relationship between Nc and the SHG intensity of HC-18-SL/G.
Figure 8:
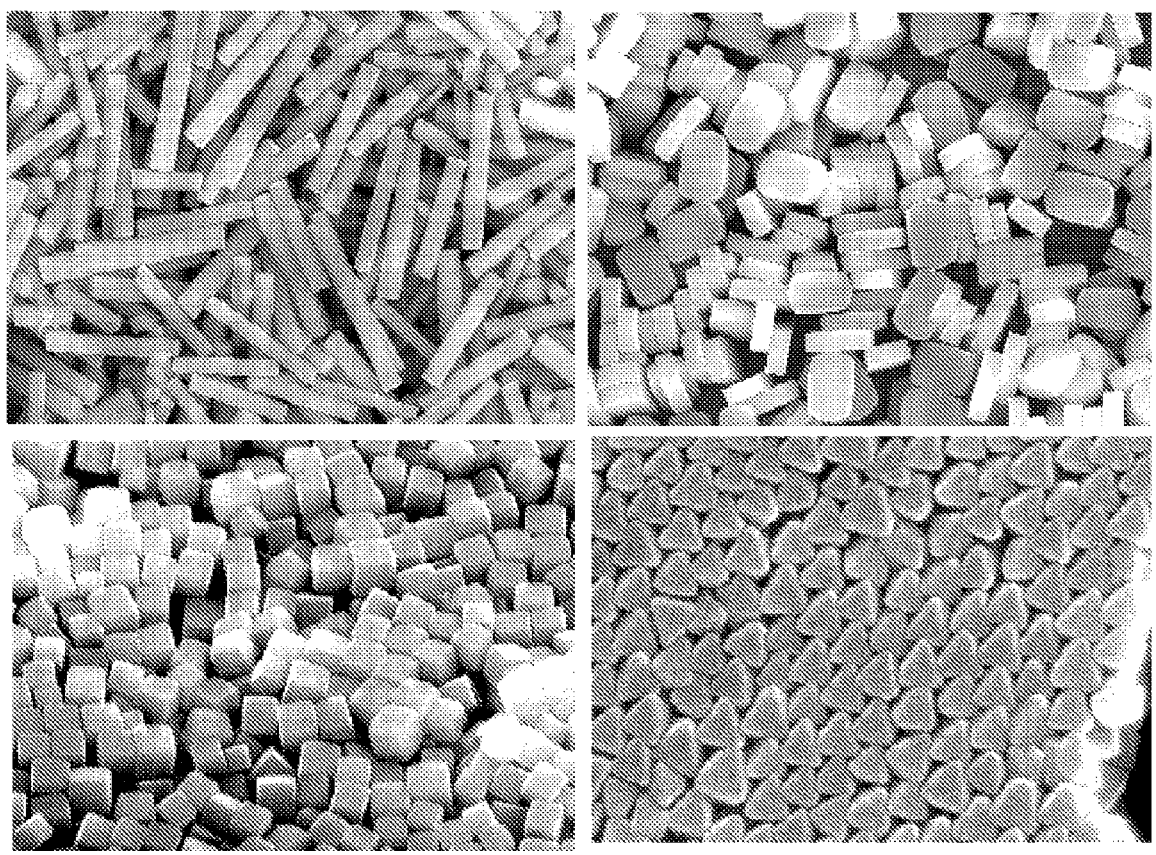
FIG. 8 shows the SEM images of uniformly oriented zeolite crystals prepared by the present inventors.
Figure 9A:
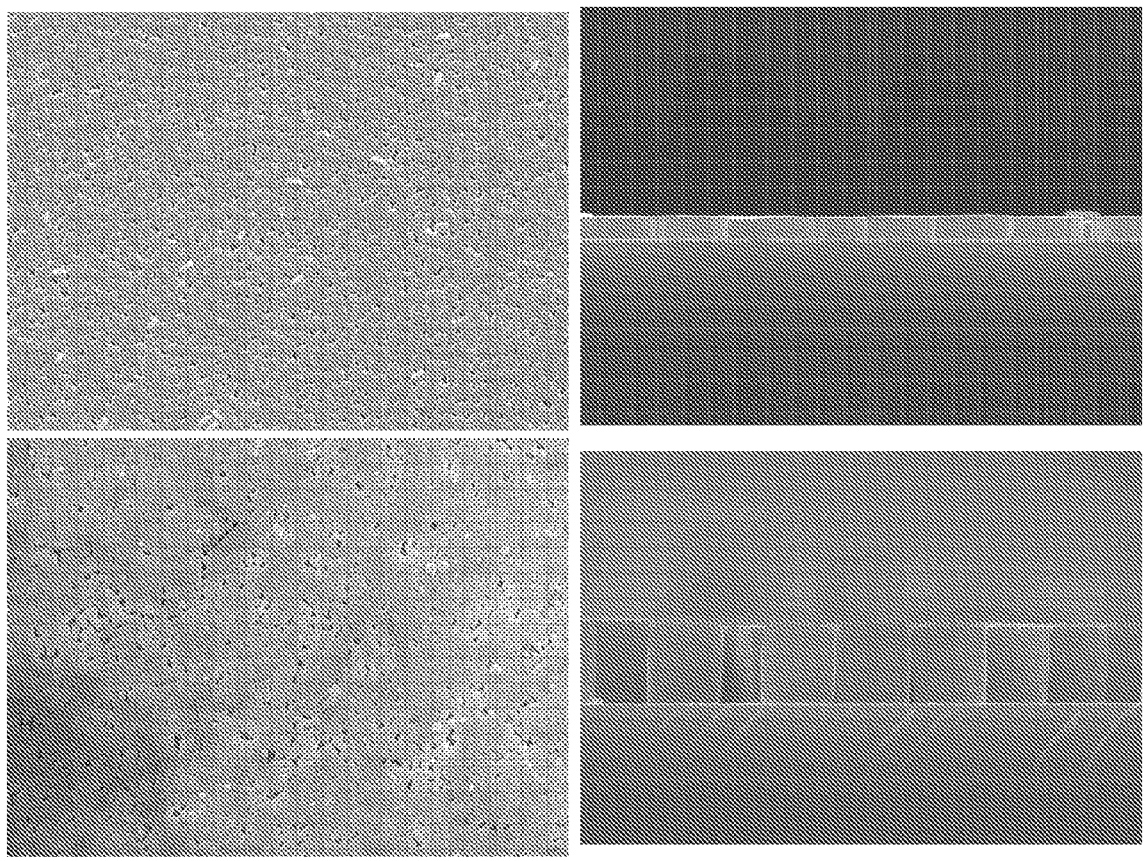
FIGS. 9A-9D show the SEM images of uniformly oriented zeolite supercrystals prepared by the present inventors.
Figure 9B:
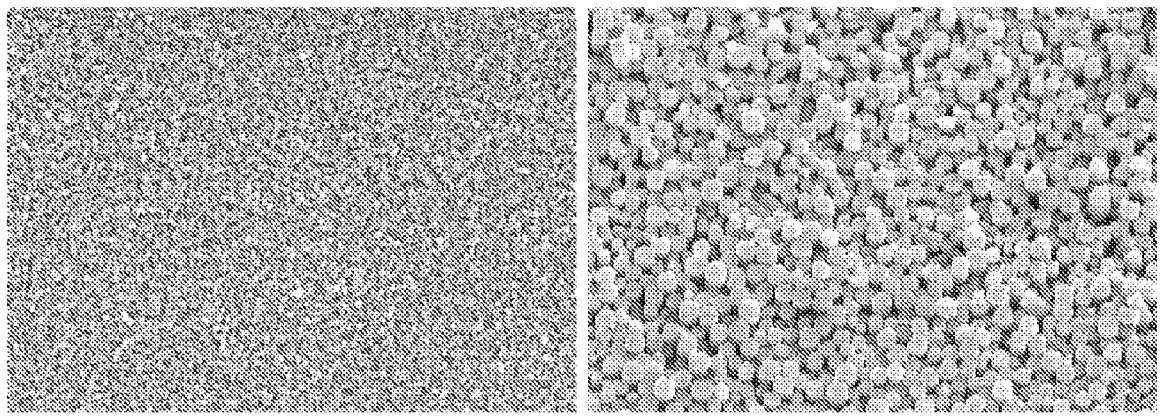
Figure 9C:
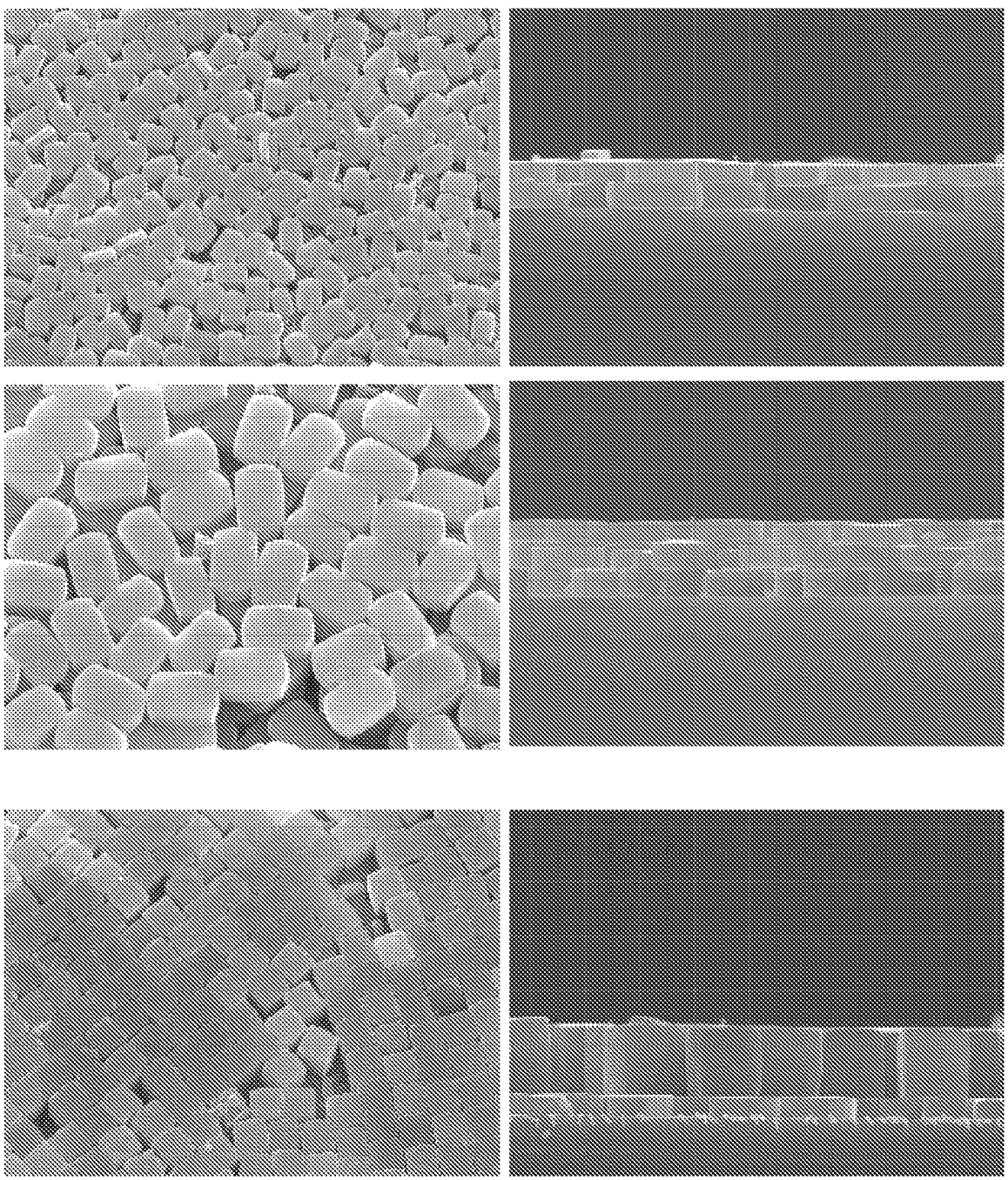
Figure 9D:
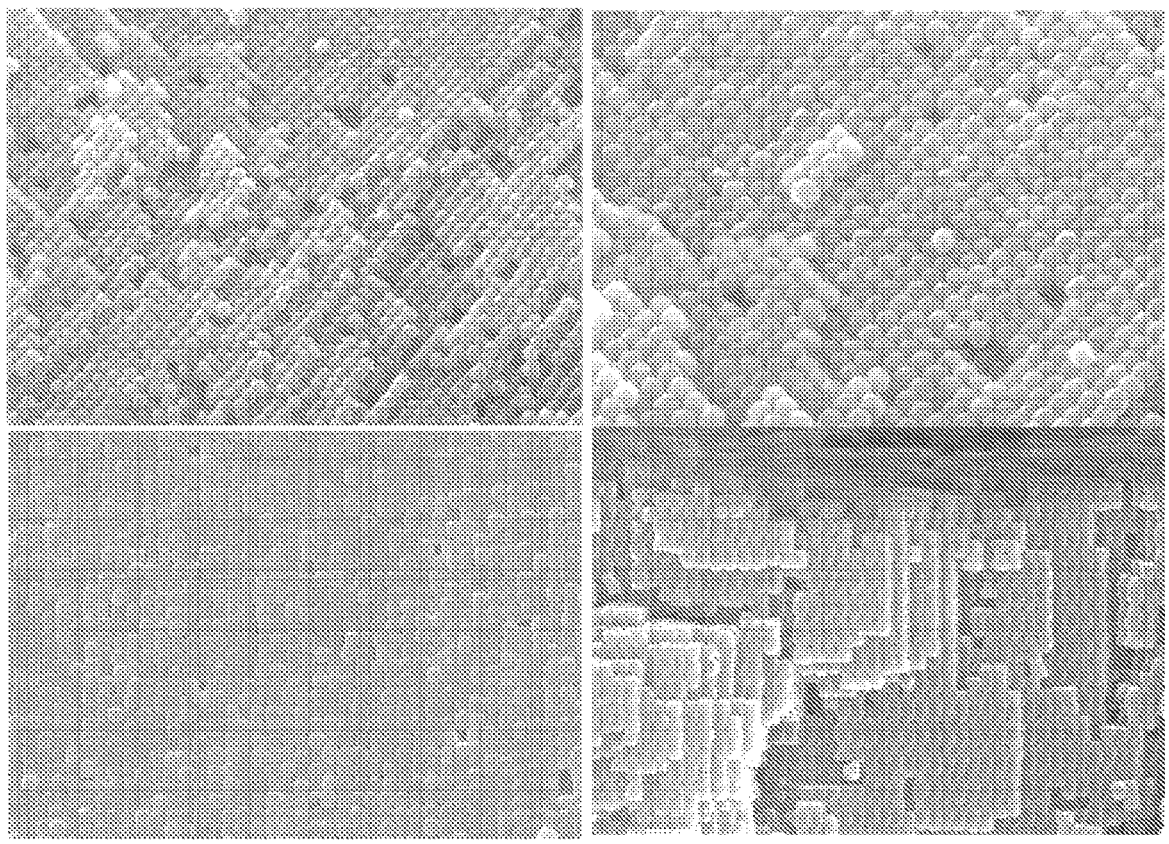
Figure 10:
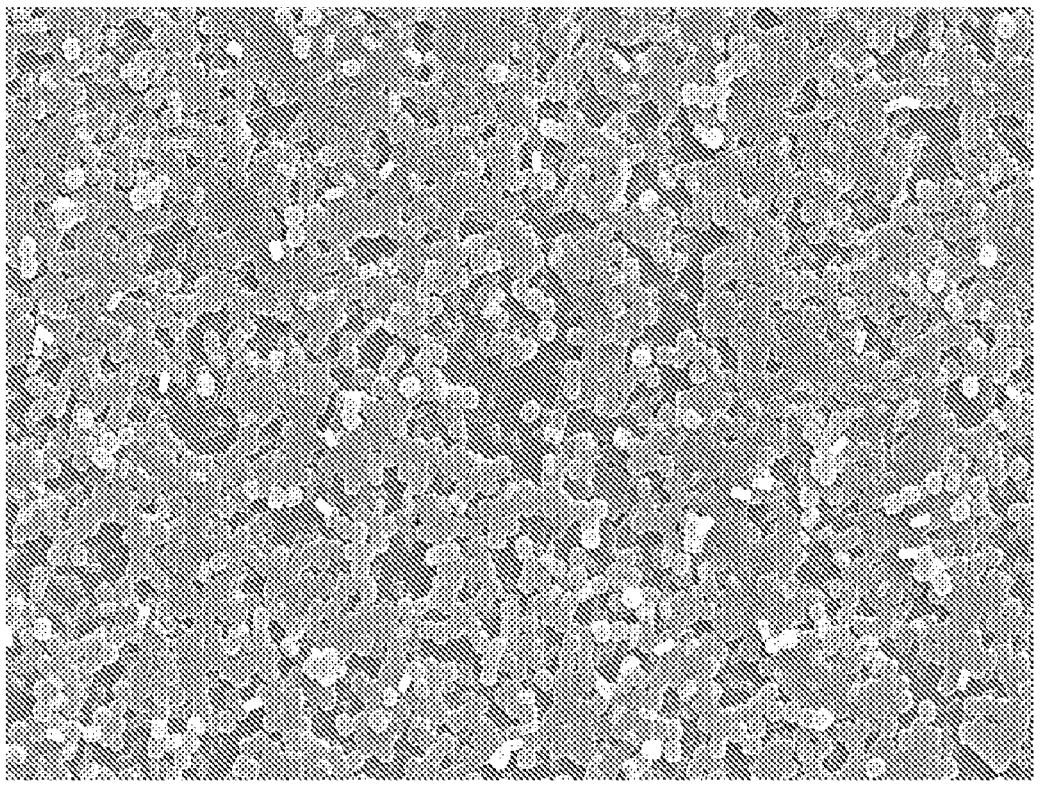
FIG. 10 shows the SEM images of uniformly orientated zeolite films on substrates prepared by the present inventors.
Figure 10:
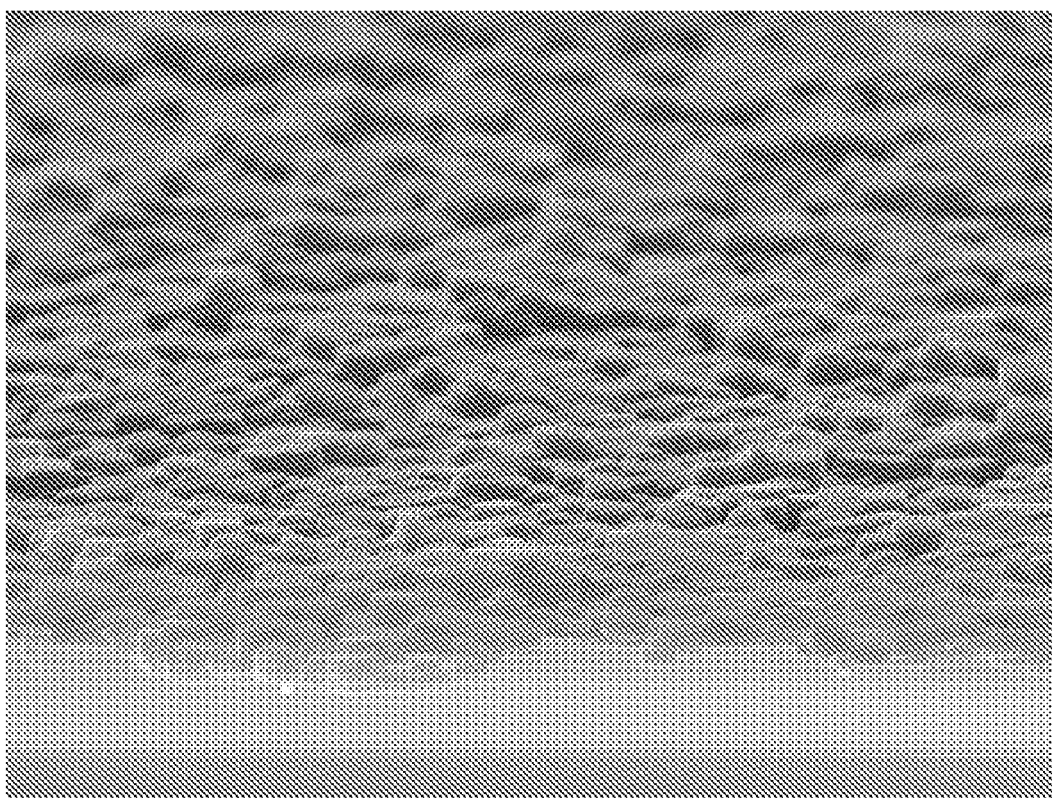

In an independent series of experiment, we also found that the SHG intensity of HC-18-SL/G increases as the loaded amount of HC-18 increases. Thus, the observed SHG intensities were 0.7, 1.6, 2.6, 4.7 and 7.5% for Nc of 1.2, 1.7, 2.2, 3.0, and 3.8, respectively. The result is also graphically shown in FIG. 7.

As noticed, the SHG intensity increases parabolically as Nc of HC-18 increases. Knowing the fact that SHG intensity is proportional to the square of the number density of the DNLO dye, the above result indicates that HC-18 molecules enter the silicalite-1 channels with the same DUA regardless of the degree of loading. The $d_{33}$ value of HC-18 (5.3 pmV$^{-1}$) is more than 10 times larger than $d_{11}$ of quartz (0.3 pmV$^{-1}$), or the $d_{33}$ value of KDP (about 3 pmV$^{-1}$), although smaller than those observed from LB films. The reason for the $d_{33}$ values of HC-n-SL/Gs being smaller than those of self-assembled molecular films is rather obvious considering the fact that the density of HC-n dyes in 400-nm thick silicalite-1 films is very small, in particular, those of long chain HC-n dyes with high DUA values. In other words, the lower $d_{33}$ value of HC-24-SL/G originates from very low N of DNLO molecules.

Furthermore, we found that the incorporated DNLO molecule-zeolite complexes of the present invention have long-term and high thermal and mechanical stabilities, which most of the LB and poled polymer NLO films are lacking. For instance, we found that HC-n-SL/Gs retained their initial SHG activities even after keeping them in the atmosphere for 1 year or in an oven at 120° C. for 24 h, and even after rubbing the surface with fingers many times.

For instance, in the case of HC-24-SL/G, $N_C$ is essentially one. The comparison of the ratio of the volumes occupied by HC-24 in HC-24-SL/G and HC-18 in a LB film, that is (1.35 nm$^2$×400 nm)/(0.42 nm$^2$×3.5 nm)=367, with the ratio of the corresponding $d_{33}$ values, 2.6/750=1/300, reveals that the lower $d_{33}$ value of HC-24-SL/G originates from very low N. However, since the volume of each silicalite-1 channel does not change even after inclusion of larger numbers of HC-24 within each channel, we believe that our methodology bears a great potential to be developed into the methods of preparing inorganic-organic composite NLO films with very high $d_{33}$ values by developing the methods of incorporating much larger numbers of HC-22 and HC-24 into the channels, perhaps by employing thicker silica zeolites with wider channels and uniform orientation. Furthermore, we found that HC-n-SL/Gs have long-term and high thermal and mechanical stabilities, which most of the LB and poled polymer NLO films are lacking.[1,2] For instance, we found that HC-n-SL/Gs retained their initial SHG activities even after keeping them in the atmosphere for 1 year or in an oven at 120° C. for 24 h, and even after rubbing the surface with fingers many times.

Overall, the present invention provides a novel approach for incorporating of a dipolar NLO dye with a high β value into a pure silica zeolite (silicalite-1) in high DUA by modification of the NLO dye. The successful demonstration of the use of zeolite films (rather than powders) as the inorganic hosts for the aligned inclusion of hemicyanine dyes verifies the great potential of the NLO-dye-including zeolites to be developed into practically viable SHG materials.

Having described a preferred embodiment of the present invention, it is to be understood that variants and modifications thereof falling within the spirit of the invention may become apparent to those skilled in this art, and the scope of this invention is to be determined by appended claims and their equivalents.

REFERENCES

1. Nalwa, H. S. et al., Nonlinear optics of organic molecules and polymers (CRC, Florida, 1997).
2. Gunter, P. et al. (eds). Nonlinear optical effects and materials. (Springer, Heidelberg, 2000).
3. (a) Eaton, D. F., et al. *J. Am. Chem. Soc.* 1987, 109, 1886-1888. (b) Tom, W., et al. *Chem. Mater.* 1989, 1, 128-140. (c) Wang, Y., et al. *Chem. Phys. Lett.* 1985, 120, 441-444. (d) Tomaru, S., et al. *Chem. Commun.* 1984, 1207-1208. (e) Weissbuch, I., et al., *Chem. Mater.* 1989, 1, 114-118.
4. Ashwell, G. J., et al. *Nature.* 1992, 357, 393-395.
5. Katz, H. E., et al. *Science* 1991, 254, 1485-1487.
6. Kanis, D. R., et al. *Chem. Rev.* 1994, 94, 195-242.
7. (a) Marks, T. J., et al. *Chem. Mater.* 2003, 15, 1064-1072. (b) Wang, G., et al. *Appl. Phys. Lett.* 2002, 16, 2169-2171. (c) Milko, E., et al. *Adv. Funct. Mater.* 2001, 11, 393-397. (d) Zhao, Y. G., et al. *Appl. Phys. Lett.* 2001, 79, 587-589. (e) Facchetti, A., et al. *Chem. Mater.* 2002, 14, 4996-5005. (f) Wostyn, K., et al. *J. Phys. Chem.* 2001, 105, 5169-5173. (g) B?ard, S., et al. *J. Am. Chem. Soc.* 2000, 122, 9444-9454. (h) Schwartz, H., et al. *Phys. Chem. B.* 2001, 105, 5914-5921. (i) Lin, S., Meech, S. R. *Langmuir* 2000, 16, 2893-2898.
8. (a) Yang, X., et al. *Angew. Chem. Int. Ed.* 1996, 35, 538-560. (b) Huang, W., et al. *Langmuir* 1999, 15, 6510-6514.
9. Dalton, L. R., et al. *Chem. Mater.* 1995, 7 1060-1081.
10. Marder, S. R., et al. *Nature.* 1997, 388, 845-851.
11. Boom, M. E. *Angew. Chem. Int. Ed.* 1996, 41, 3363-3366.
12. Samyn, C., et al. *Macromol. Rapid Commun.* 2000, 21, 1-15
13. (a) Saadeh, H., et al. *J. Mater. Chem.* 1999, 9, 1865-1873. (b) Steire, W. H. *Chem. Phys.* 1999, 245, 487-506. (c)

Jiang, H., Kakkar, A. K. *J. Am. Chem. Soc.* 1999, 121, 3657-3665. (d) Dalton, L. R. *J. Mater. Chem.* 1999, 9, 1905-1920.
14. Cox, S. D., et al. *J. Am. Chem. Soc.* 1988, 110, 2986-2987.
15. (a) Cox, S. D., et al. *Chem. Mater.* 1990, 2, 609-619. (b) Cox, S. D., et al. *Solid. State. Tonics.* 1989, 32, 514-520.
16. Marlow, F., et al. *J. Phys. Chem.* 1994, 98, 12315-12319.
17. Caro, J., et al. *Progress in Zeolite Microporous Materials.* 1997, 105, 2171-2178
18. Marlow, F., et al. *J. Phys Chem.* 1993, 97, 11286-11290.
19. Werner, L., et al. *Zeolite* 1992, 12, 658-663.
20. Reck, G., et al. *J. Phys. Chem.* 1996, 100, 1698-1704.
21. Kinski, I., et al. *Microporous Mesoporous Materials* 2002, 56, 11-25.
22. Kinski, I., et al. *zeolites* 1997, 19, 375-381.
23. Persoons, A., Clays, K. *Phys. Rev. Lett.* 1991, 66, 2980-2983.
24. St?elin, M., et al. *Chem. Phys. Lett.* 1992, 191, 245-250.
25. (a) Maker, P. D., et al. *Phys. Rev. Lett.* 1962, 8, 21-22. (b) Herman, W. N., Hayden, L. M. *J. Opt. Soc. Am. B.* 1995, 12, 416-427.
26. (a) Auerbach, S. M., et al. (eds). Handbook of Zeolite Science and Technology, Marcel Dekker, Inc. New York, 2003, chapter 17 edited by Nair. S, Tsapatsis. M. (b) Yan, Y., et al. *Ind. Eng. Chem. Res.* 1995, 34, 1652-1661. (c) Hedlund, J., et al. *Microporous Mesoporous Materials* 1999, 28, 185-194. (d) Tsilkoyiannis, J. G., Hagg, W. O. *Zeolites* 1992, 12, 126-130. (e) Exter, M. J., et al. *Zeolites* 1997, 19, 13-20. (f) Wang, Z., Yan, Y. *Chem. Mater.* 2001, 13, 1101-1107. (g) Xomeritakis, G., Tsapatsis, M. *Chem. Mater.* 1999, 11, 875-878. (h) Ha, K., et al. *Adv. Mater.* 2001, 13, 594-596.
27. Baerlocher, Ch., Meier(eds), W. M. Atlas of zeolite framework types (5th revised ed.), 2001, Elsevier, p 184.
28. (a) Boyd, R. W. Nonlinear Optics (2nd ed.) 2003, Academic, London, p. 48. (b) Shen, Y. R. The Principles of Nonlinear Optics, 1988, Wiley, New York, p 101.
29. Nakanishi, H. *Mol. Cryst. Liq. Cryst.* 1995. 267, 89-94
30. Marowsky, G., et al. *Chem. Phys. Lett.* 1988, 147, 420-424.
31. Bubeck, C., et al. *Adv. Mater.* 1991, 3, 54-59.

What is claimed is:

1. A method for incorporating into zeolite pores dipolar nonlinear optical (DNLO) molecules in a uniform orientation, which comprises the steps of:
    (a) preparing a R-[D-π-A] or [D-π-A]-R by linking a R-group to the terminal of a parent molecule ([D-π-A]) of the dipolar nonlinear optical (DNLO) molecule; and
    (b) incorporating the R-[D-π-A] or [D-π-A]-R into the zeolite pores, wherein the R-group has hydrophobicity, the parent molecule ([D-π-A]) has hydrophilicity, D represents an electron donor portion, A represents an electron acceptor portion, and R represents alkyl, alkenyl, cycloalkyl, cycloalkenyl, aryl, heteroaryl, arylalkyl, arylalkenyl, alkylaryl or their combination,
    wherein the zeolites are in a uniform orientation, and
    wherein when the zeolite pores are hydrophobic, the incorporation of the R-[D-π-A] or [D-π-A]-R into the zeolite pores occurs in the direction of its hydrophobic R-group and when the zeolite pores are hydrophilic, and the incorporation of the R-[D-π-A] or [D-π-A]-R into the zeolite pore occurs in the direction of its hydrophilic [D-π-A], whereby the DNLO molecules incorporated into the zeolite pores are present in only one orientation.

2. The method according to claim 1, wherein said zeolite is selected from the group consisting of (i) natural and synthetic zeolites; (ii) modified molecular sieves wherein all or a part of silicon atoms in their zeolite skeleton are replaced with other atoms; (iii) modified molecular sieves in which all or a part of aluminum atoms in their zeolite skeleton are replaced with other atoms; (iv) molecular sieves prepared by the combination of the above modifications of items ii) and iii); (v) porous metals or silicon oxides or composite oxides thereof; and (vi) porous molecular sieves prepared using any other elements alone or in a combination.

3. The method according to claim 1, wherein said zeolite is in the form of (i) a film prepared by growing zeolite microcrystals on a substrate, (ii) a thin film of mono- or multi-layered zeolite microcrystals on substrate, or (iii) a supercrystal of two or three dimensional aggregates of zeolite microcrystals.

4. The method according to claim 1, wherein said R-[D-π-A] or [D-π-A]-R molecules are incorporated into opposite both sides of said zeolite pores, whereby a part of said R-[D-π-A] or [D-π-A]-R molecules incorporated are present in the opposition orientation to a residual part of said R-[D-π-A] or [D-π-A]-R molecules incorporated.

5. A DNLO-zeolite film composite comprising DNLO (dipolar nonlinear optical) molecules incorporated in a zeolite film, wherein the zeolite film is prepared by growing zeolite microcrystals on a substrate, the zeolites are in a uniform orientation, and said incorporated DNLO molecules are present in only one orientation.

6. The DNLO-zeolite film composite according to claim 5, wherein said zeolite film is prepared by growing zeolite microcrystals unidirectionally on a substrate.

7. The DNLO-zeolite film composite according to claim 5, wherein said composite is prepared by incorporating into zeolite pores dipolar nonlinear optical (DNLO) molecules in a uniform orientation, including the steps of:
    (a) preparing a R-[D-π-A] or [D-π-A]-R by linking a R-group to the terminal of a parent molecule ([D-π-A]) of the dipolar nonlinear optical (DNLO) molecule; and
    (b) incorporating the R-[D-π-A] or [D-π-A]-R into the zeolite pores, wherein the R-group has hydrophobicity, the parent molecule ([D-π-A]) has hydrophilicity, D represents an electron donor portion, A represents an electron acceptor portion, R represents alkyl, alkenyl, cycloalkyl, cycloalkenyl, aryl, heteroaryl, arylalkyl, arylalkenyl, alkylaryl or their combination;
    wherein when the zeolite pores are hydrophobic, the incorporation of the R-[D-π-A] or [D-π-A]-R into the zeolite pores occurs in the direction of its hydrophobic R-group and when the zeolite pores are hydrophilic, the incorporation of the R-[D-π-A] or [D-π-A]-R into the zeolite pore occurs in the direction of its hydrophilic [D-π-A], whereby the DNLO molecules incorporated into the zeolite pores are present in the uniform orientation.

8. The composite according to claim 5, wherein said DNLO molecules incorporated have hyperpoloarizability (β value) of more than $100 \times 10^{-30}$ esu.

9. The composite according to claim 8, wherein said DNLO molecules incorporated have hyperpoloarizability (β value) of more than $500 \times 10^{-30}$ esu.

10. A DNLO-zeolite thin film composite comprising DNLO (dipolar nonlinear optical) molecules incorporated in a zeolite thin film, wherein the zeolite thin film is prepared by arranging zeolite microcrystals to form a mono- or multi-layer on a substrate, the zeolites are in a uniform orientation, and said incorporated DNLO molecules are present in only one orientation.

11. The DNLO-zeolite thin film composite according to claim 10, wherein said zeolite thin film is prepared by arranging zeolite microcrystals unidirectionally on a substrate.

12. The DNLO-zeolite thin film composite according to claim 10, wherein said composite is prepared by incorporating into zeolite pores dipolar nonlinear optical (DNLO) molecules in a uniform orientation, including the steps of:
(a) preparing a R-[D-π-A] or [D-π-A]-R by linking a R-group to the terminal of a parent molecule ([D-π-A]) of the dipolar nonlinear optical (DNLO) molecule; and
(b) incorporating the R-[D-π-A] or [D-π-A]-R into the zeolite pores, wherein the R-group has hydrophobicity, the parent molecule ([D-π-A]) has hydrophilicity, D represents an electron donor portion, A represents an electron acceptor portion, R represents alkyl, alkenyl, cycloalkyl, cycloalkenyl, aryl, heteroaryl, arylalkyl, arylalkenyl, alkylaryl or their combination;
wherein when the zeolite pores are hydrophobic, the incorporation of the R-[D-π-A] or [D-π-A]-R into the zeolite pores occurs in the direction of its hydrophobic R-group and when the zeolite pores are hydrophilic, the incorporation of the R-[D-π-A] or [D-π-A]-R into the zeolite pore occurs in the direction of its hydrophilic [D-π-A], whereby the DNLO molecules incorporated into the zeolite pores are present in the uniform orientation.

13. The composite according to claim 10, wherein said DNLO molecules incorporated have hyperpoloarizability (β value) of more than $100 \times 10^{-30}$ esu.

14. A DNLO-zeolite thin film composite comprising DNLO (dipolar nonlinear optical) molecules incorporated in a zeolite thin film, wherein the zeolite thin film is prepared by arranging zeolite microcrystals to form a mono- or multilayer on a substrate, the zeolites are in a uniform orientation, and a part of said incorporated DNLO molecules are present in the opposition orientation to a residual part of said incorporated DNLO molecules.

15. The DNLO-zeolite thin film composite according to claim 14, wherein said zeolite thin film is prepared by arranging zeolite microcrystals undirectionally on a substrate.

16. The DNLO-zeolite thin film composite according to claim 14, wherein said composite is prepared by incorporating into zeolite pores dipolar nonlinear optical (DNLO) molecules in a uniform orientation, including the steps of:
(a) preparing a R-[D-π-A] or [D-π-A]-R by linking a R-group to the terminal of a parent molecule ([D-π-A]) of the dipolar nonlinear optical (DNLO) molecule; and
(b) incorporating the R-[D-π-A] or [D-π-A]-R into the zeolite pores, wherein the R-group has hydrophobicity, the parent molecule ([D-π-A]) has hydrophilicity, D represents an electron donor portion, A represents an electron acceptor portion, and R represents alkyl, alkenyl, cycloalkyl, cycloalkenyl, aryl, heteroaryl, arylalkyl, arylalkenyl, alkylaryl or their combination,
wherein when the zeolite pores are hydrophobic, the incorporation of the R-[D-π-A] or [D-π-A]-R into the zeolite pores occurs in the direction of its hydrophobic R-group and when the zeolite pores are hydrophilic, and the incorporation of the R-[D-π-A] or [D-π-A]-R into the zeolite pore occurs in the direction of its hydrophilic [D-π-A], whereby the DNLO molecules incorporated into the zeolite pores are present in the uniform orientation.

17. The composite according to claim 14, wherein said DNLO molecules incorporated have hyperpoloarizability (β value) of more than $100 \times 10^{-30}$ esu.

18. A DNLO-zeolite supercrystal composite comprising DNLO (dipolar nonlinear optical) molecules incorporated in a zeolite supercrystal prepared by aligning zeolite microcrystals uniformly in two- or three dimension, wherein the zeolite supercrystal is prepared by aligning zeolite microcrystals uniformly in two- or three dimension, the zeolites are in a uniform orientation, and said incorporated DNLO molecules are present in only one orientation.

19. The DNLO-zeolite supercrystal composite according to claim 18, wherein said composite is prepared by incorporating into zeolite pores dipolar nonlinear optical (DNLO) molecules in a uniform orientation, including the steps of:
(a) preparing a R-[D-π-A] or [D-π-A]-R by linking a R-group to the terminal of a parent molecule ([D-π-A]) of the dipolar nonlinear optical (DNLO) molecule; and
(b) incorporating the R-[D-π-A] or [D-π-A]-R into the zeolite pores, wherein the R-group has hydrophobicity, the parent molecule ([D-π-A]) has hydrophilicity, D represents an electron donor portion, A represents an electron acceptor portion, R represents alkyl, alkenyl, cycloalkyl, cycloalkenyl, aryl, heteroaryl, arylalkyl, arylalkenyl, alkylaryl or their combination;
wherein when the zeolite pores are hydrophobic, the incorporation of the R-[D-π-A] or [D-π-A]-R into the zeolite pores occurs in the direction of its hydrophobic R-group and when the zeolite pores are hydrophilic, the incorporation of the R-[D-π-A] or [D-π-A]-R into the zeolite pore occurs in the direction of its hydrophilic [D-π-A], whereby the DNLO molecules incorporated into the zeolite pores are present in the uniform orientation.

20. The composite according to claim 18, wherein said DNLO molecules incorporated have hyperpoloarizability (β value) of more than $100 \times 10^{-30}$ esu.

21. A DNLO-zeolite supercrystal composite comprising DNLO (dipolar nonlinear optical) molecules incorporated in a zeolite supercrystal, wherein the zeolite supercrystal is prepared by aligning zeolite microcrystals uniformly in two- or three dimension, the zeolites are in a uniform orientation, and a part of said incorporated DNLO molecules are present in the opposition orientation to a residual part of said incorporated DNLO molecules.

22. The DNLO-zeolite supercrystal composite according to claim 21, wherein said composite is prepared by incorporating into zeolite pores dipolar nonlinear optical (DNLO) molecules in a uniform orientation, including the steps of:
(a) preparing a R-[D-π-A] or [D-π-A]-R by linking a R-group to the terminal of a parent molecule ([D-π-A]) of the dipolar nonlinear optical (DNLO) molecule; and
(b) incorporating the R-[D-π-A] or [D-π-A]-R into the zeolite pores, wherein the R-group has hydrophobicity, the parent molecule ([D-π-A]) has hydrophilicity, D represents an electron donor portion, A represents an electron acceptor portion, R represents alkyl, alkenyl, cycloalkyl, cycloalkenyl, aryl, heteroaryl, arylalkyl, arylalkenyl, alkylaryl or their combination;
wherein when the zeolite pores are hydrophobic, the incorporation of the R-[D-π-A] or [D-π-A]-R into the zeolite pores occurs in the direction of its hydrophobic R-group and when the zeolite pores are hydrophilic, the incorporation of the R-[D-π-A] or [D-π-A]-R into the zeolite pore occurs in the direction of its hydrophilic [D-π-A], whereby the DNLO molecules incorporated into the zeolite pores are present in the uniform orientation.

23. The composite according to claim 21, wherein said DNLO molecules incorporated have hyperpoloarizability (β value) of more than $100 \times 10^{-30}$ esu.

* * * * *